US008275167B2

(12) United States Patent
Tabata et al.

(10) Patent No.: US 8,275,167 B2
(45) Date of Patent: Sep. 25, 2012

(54) IMAGE PROCESSING APPARATUS AND VERIFICATION SYSTEM

(75) Inventors: Shinji Tabata, Ashigarakami-gun (JP); Shinji Sasahara, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1107 days.

(21) Appl. No.: 12/172,719

(22) Filed: Jul. 14, 2008

(65) Prior Publication Data
US 2009/0092279 A1 Apr. 9, 2009

(30) Foreign Application Priority Data

Oct. 4, 2007 (JP) ................................ 2007-261136

(51) Int. Cl.
 *G06K 9/00* (2006.01)
 *G06K 9/46* (2006.01)
 *G06K 9/68* (2006.01)
(52) U.S. Cl. ..................... 382/100; 382/190; 382/218
(58) Field of Classification Search .................. 382/100, 382/181, 190, 209, 218
See application file for complete search history.

(56) References Cited

U.S. PATENT DOCUMENTS

| 4,961,231 | A  | * | 10/1990 | Nakayama et al. ............ 382/197 |
| 6,339,377 | B1 | * | 1/2002  | Naka et al. .................. 340/572.1 |
| 6,741,727 | B1 | * | 5/2004  | Hirasawa ...................... 382/112 |
| 7,331,725 | B2 | * | 2/2008  | Troyansky et al. ............ 400/106 |
| 7,374,098 | B2 | * | 5/2008  | Salib et al. ..................... 235/492 |
| 2008/0129502 | A1 | * | 6/2008 | Fuse et al. ................... 340/568.1 |

FOREIGN PATENT DOCUMENTS

| JP | A-09-120456   | 5/1997  |
| JP | A-9-120456    | 5/1997  |
| JP | A-09-226227   | 9/1997  |
| JP | B1-2893336    | 5/1999  |
| JP | A-2001-134765 | 5/2001  |
| JP | A-2001-265183 | 9/2001  |
| JP | A-2003-271907 | 9/2003  |
| JP | A-2004-285524 | 10/2004 |
| JP | A-2005-038389 | 2/2005  |
| JP | A-2006-268549 | 10/2006 |
| JP | A-2007-256101 | 10/2007 |

OTHER PUBLICATIONS

Jan. 26, 2010 Office Action issued in Japanese Patent Application No. 2007-261136 (with translation).

* cited by examiner

*Primary Examiner* — Daniel Mariam
(74) *Attorney, Agent, or Firm* — Oliff & Berridge, PLC

(57) ABSTRACT

There is provided an image processing apparatus including: an image information acquisition unit that acquires image information representing an image obtained by reading a recording medium containing one or a plurality of detectable substances; an extraction unit that extracts an image corresponding to the detectable substances from the image information acquired by the image information acquisition unit; a computation unit that computes feature quantities of distribution of the detectable substances in the recording medium based on the image corresponding to the detectable substances extracted by the extraction unit; and a memory that stores the feature quantities computed by the computation unit.

20 Claims, 18 Drawing Sheets

ONE  TWO  THREE

FIG. 4

| PAPER MEDIUM ID | TOTAL NUMBER | NUMBER BY AREA | | | | | | | | | NUMBER BY NUMBER OF OVERLAPS | | | NUMBER BY ANGULAR RANGE | | | |
|---|---|---|---|---|---|---|---|---|---|---|---|---|---|---|---|---|---|
| | | F1 | F2 | F3 | F4 | F5 | F6 | F7 | F8 | F9 | ONE | TWO | THREE OR MORE | R1 | R2 | R3 | R4 |
| 1 | 8 | 0 | 1 | 1 | 0 | 0 | 2 | 1 | 2 | 1 | 6 | 1 | 1 | 8 | 0 | 0 | 0 |
| 2 | 11 | 1 | 3 | 0 | 1 | 2 | 1 | 0 | 3 | 0 | 9 | 2 | 0 | 9 | 1 | 1 | 0 |
| 3 | 12 | 0 | 1 | 2 | 0 | 3 | 0 | 1 | 3 | 2 | 10 | 1 | 1 | 2 | 3 | 6 | 1 |
| 4 | 7 | 0 | 2 | 0 | 1 | 1 | 0 | 0 | 0 | 3 | 2 | 3 | 2 | 0 | 5 | 1 | 1 |
| 5 | 13 | 1 | 4 | 2 | 0 | 3 | 2 | 0 | 1 | 0 | 8 | 5 | 0 | 1 | 8 | 2 | 2 |
| 6 | 10 | 3 | 2 | 0 | 1 | 1 | 0 | 0 | 2 | 2 | 6 | 3 | 1 | 2 | 0 | 5 | 3 |
| 7 | 10 | 0 | 0 | 2 | 0 | 2 | 0 | 3 | 0 | 1 | 8 | 0 | 2 | 2 | 2 | 3 | 3 |
| 8 | 9 | 3 | 0 | 0 | 2 | 0 | 0 | 2 | 2 | 2 | 9 | 0 | 0 | 3 | 2 | 3 | 1 |
| 9 | 10 | 0 | 1 | 1 | 1 | 3 | 0 | 1 | 2 | 1 | 7 | 2 | 1 | 3 | 2 | 1 | 4 |
| 10 | 14 | 5 | 0 | 1 | 0 | 0 | 3 | 0 | 2 | 3 | 8 | 3 | 3 | 1 | 5 | 3 | 5 |

241

FIG. 5
| PAPER MEDIUM ID | TIME AND DATE OF IMAGE CREATION | DEVICE ID | FILE ID | NUMBER OF PAGES | USER ID | TRANSFER PERMITTED/ PROHIBITED |
|---|---|---|---|---|---|---|
| 1 | 2006.11.25 | 1 | File 1 | 1 | A | PROHIBITED |
| 2 | 2006.11.27 | 1 | File 2 | 1 | A | PROHIBITED |
| 3 | 2006.11.27 | 1 | File 3 | 1 | B | PERMITTED |
| 4 | 2006.11.27 | 1 | File 3 | 2 | B | PERMITTED |
| 5 | 2006.11.27 | 1 | File 3 | 3 | B | PERMITTED |
| 6 | 2006.11.28 | 1 | File 4 | 1 | A | PROHIBITED |
| 7 | 2006.11.28 | 1 | File 4 | 2 | A | PROHIBITED |
| 8 | 2006.11.29 | 2 | File 5 | 1 | C | PERMITTED |
| 9 | 2006.11.30 | 2 | File 6 | 1 | D | PROHIBITED |
| 10 | 2006.11.30 | 2 | File 7 | 1 | B | PERMITTED |
242
FIG. 6
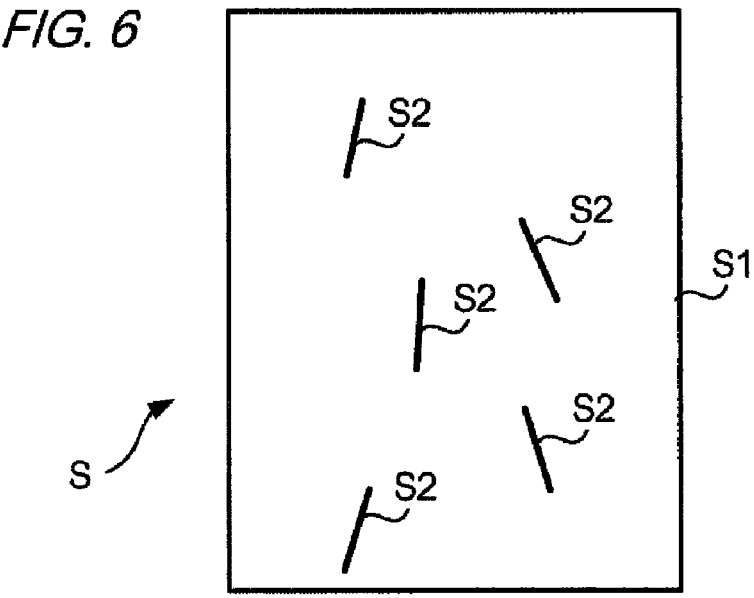
FIG. 7
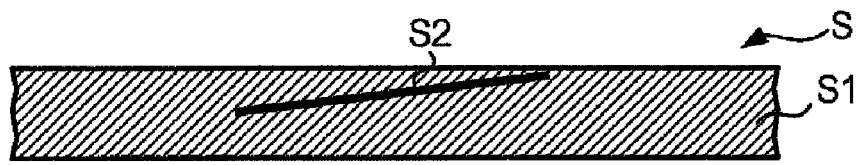

| OBJECT | LENGTH | PERIMETER | AREA | CENTROID (X) | CENTROID (Y) | ANGLE |
|---|---|---|---|---|---|---|
| A | 650 | 2215 | 41895 | 2546 | 899 | 172 |
| B | 595 | 1250 | 21015 | 4118 | 1356 | 143 |
| C | 612 | 1322 | 22078 | 987 | 3882 | 158 |
| D | 620 | 1292 | 21977 | 2408 | 2609 | 58 |
| E | 603 | 1185 | 21850 | 1939 | 4003 | 32 |
| F | 720 | 2180 | 43096 | 2764 | 3978 | 176 |
| G | 625 | 1305 | 22606 | 908 | 5441 | 27 |
| H | 840 | 3286 | 61874 | 2618 | 5603 | 33 |
| I | 597 | 1237 | 20885 | 2217 | 6740 | 76 |
| J | 590 | 1221 | 21698 | 3868 | 6659 | 123 |

FIG. 18

| OBJECT | LENGTH | PERIMETER | AREA | CENTROID (X) | CENTROID (Y) | ANGLE | AREA | NUMBER OF OVERLAPS | ANGULAR RANGE |
|---|---|---|---|---|---|---|---|---|---|
| A | 650 | 2215 | 41895 | 2546 | 899 | 172 | F2 | 2 | R4 |
| B | 595 | 1250 | 21015 | 4118 | 1356 | 143 | F3 | 1 | R4 |
| C | 612 | 1322 | 22078 | 987 | 3882 | 158 | F4 | 1 | R4 |
| D | 620 | 1292 | 21977 | 2408 | 2609 | 58 | F5 | 1 | R2 |
| E | 603 | 1185 | 21850 | 1939 | 4003 | 32 | F5 | 1 | R1 |
| F | 720 | 2180 | 43096 | 2764 | 3978 | 176 | F5 | 2 | R4 |
| G | 625 | 1305 | 22606 | 908 | 5441 | 27 | F7 | 1 | R1 |
| H | 840 | 3286 | 61874 | 2618 | 5603 | 33 | F8 | 3 | R1 |
| I | 597 | 1237 | 20885 | 2217 | 6740 | 76 | F8 | 1 | R2 |
| J | 590 | 1221 | 21698 | 3868 | 6659 | 123 | F9 | 1 | R3 |

FIG. 19

| TOTAL | NUMBER BY AREA | | | | | | | | | NUMBER BY NUMBER OF OVERLAPS | | | NUMBER BY ANGULAR RANGE | | | |
|---|---|---|---|---|---|---|---|---|---|---|---|---|---|---|---|---|
| | AREA F1 | AREA F2 | AREA F3 | AREA F4 | AREA F5 | AREA F6 | AREA F7 | AREA F8 | AREA F9 | ONE | TWO | THREE OR MORE | ANGLE R1 | ANGLE R2 | ANGLE R3 | ANGLE R4 |
| 10 | 0 | 1 | 1 | 1 | 3 | 0 | 1 | 2 | 1 | 7 | 2 | 1 | 3 | 2 | 1 | 4 |

| | TOTAL | AREA | | | | | | | | | NUMBER OF OVERLAPS | | | ANGULAR RANGE | | | |
|---|---|---|---|---|---|---|---|---|---|---|---|---|---|---|---|---|---|
| FRONT | — | F1 | F2 | F3 | F4 | F5 | F6 | F7 | F8 | F9 | — | — | — | R1 | R2 | R3 | R4 |
| REVERSE | — | F3 | F2 | F1 | F6 | F5 | F4 | F9 | F8 | F7 | — | — | — | R4 | R3 | R2 | R1 |

IMAGE PROCESSING APPARATUS AND VERIFICATION SYSTEM

CROSS-REFERENCE TO RELATED APPLICATIONS

This application is based on and claims priority under 35 U.S.C. 119 from Japanese Patent Application No. 2007-261136, which was filed on Oct. 4, 2007.

BACKGROUND

1. Technical Field

The present invention relates to an image processing apparatus and a verification system.

2. Related Art

A technique is known, in which extraneous substance, such as metallic wires, etc. (detectable substances) is inlaid in paper or another sheet-like recording medium and improper taking out of the recording medium is made known by detecting the extraneous substance.

SUMMARY

In an aspect of the invention, there is provided an image processing apparatus comprising: an image information acquisition unit that acquires image information representing an image obtained by reading a recording medium containing one or a plurality of detectable substances; an extraction unit that extracts an image corresponding to the detectable substances from the image information acquired by the image information acquisition unit; a computation unit that computes feature quantities of distribution of the detectable substances in the recording medium based on the image corresponding to the detectable substances extracted by the extraction unit; and a memory that stores the feature quantities computed by the computation unit.

BRIEF DESCRIPTION OF THE DRAWINGS

Exemplary embodiments of the present invention will be described in detail based on the following figures, wherein:

FIG. 4 is a diagram illustrating an exemplary ID information management table;

FIG. 5 is a diagram illustrating an exemplary attribute information management table;

FIG. 6 is a diagram illustrating an example of paper media;

FIG. 7 is a diagram illustrating an example of paper media;

FIG. 18 is a diagram illustrating image areas, angular ranges, and the number of overlaps identified for each object;

FIG. 19 is a diagram illustrating the feature quantities of detectable substance distribution recorded in the information management table by the control unit of the registration device;

DETAILED DESCRIPTION

Some exemplary embodiments of the present invention are explained below with reference to drawings.

A. Exemplary Embodiment 1

1. Configuration

Figure 1:
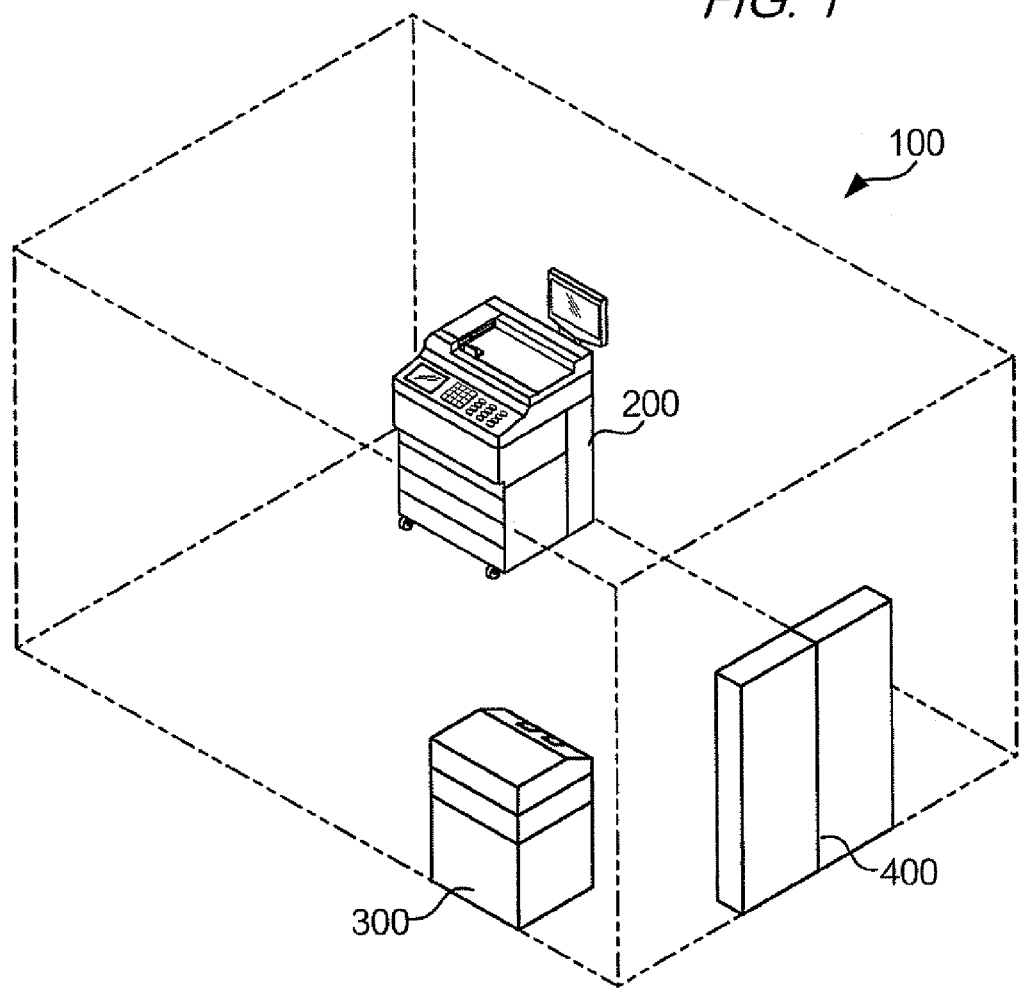
FIG. 1 is a perspective view illustrating the overall configuration of the verification system.

FIG. 1 is a perspective view illustrating the overall configuration of a verification system 100 used in an exemplary embodiment of the present invention. As shown in FIG. 1, the verification system 100 includes a registration device 200, which is a first device, a verification device 300, which is a second device, and a door 400 that can be opened and closed in a gate-like manner. The verification system 100 is located in a spatial region delimiting a predetermined scope, such as, for instance, a room, etc. at an enterprise or school. Multiple sheet-like media (hereinafter referred to as "printed materials") having visible images formed thereon are located within this spatial region, with some of the printed materials containing media whose taking out to external spatial regions is prohibited. The recording media constituting the printed materials are represented, for example, by paper media, with the paper media containing one or multiple metal detectable substances inlaid therein in advance. The registration device 200, which is, for instance, an electrophotographic-type image forming device, forms user-specified visible images on the paper medium, and, along with that, optically reads the paper medium (first recording medium), computes the feature quantities of distribution of the detectable substances inlaid in the medium, and stores them. The verification device 300 is, for instance, a scanner device, which optically reads images on a printed material (second recording medium) and is located in the vicinity of the door 400. The door 400 is normally closed, with the opening/closing of the door 400 controlled by a door opening/closing unit 401, which is described below.

A user carrying a printed material and intending to go outside through the door 400, lets the verification device 300 read the printed material. The verification device 300 reads the printed material and computes the feature quantities of distribution of the detectable substances inlaid in the printed material. The registration device 200 and verification device 300 are connected wirelessly or via a landline so as permit communication therebetween. The verification device 300 verifies the feature quantities of detectable substance distribution the verification device computed itself against the feature quantities of detectable substance distribution stored by the registration device 200 and outputs the results of verification. At such time, the verification device 300 opens the door 400 if the results of verification satisfy certain prescribed conditions and the printed material is not prohibited from being taken out to external spatial regions; otherwise, the verification device makes sure that the door 400 stays closed if the results of verification do not satisfy the prescribed conditions and the printed material is prohibited from being taken out to external spatial regions. It should be noted that the above-mentioned prescribed conditions are determined by the correlation between the feature quantities of distribution subject to verification (number of matching feature quantities, feature quantity values). Moreover, the door 400 is not necessarily an open able/closable door and, for instance, gates that normally permit passage and are made up of panels located at the entrance and at the exit may be used as well. In such a case, emergency alarms or sirens are located at the gates and, instead of closing doors, sounds and lights are used to generate an alert when a printed material whose taking out is prohibited is about to be taken out.

Figures 2, 16:
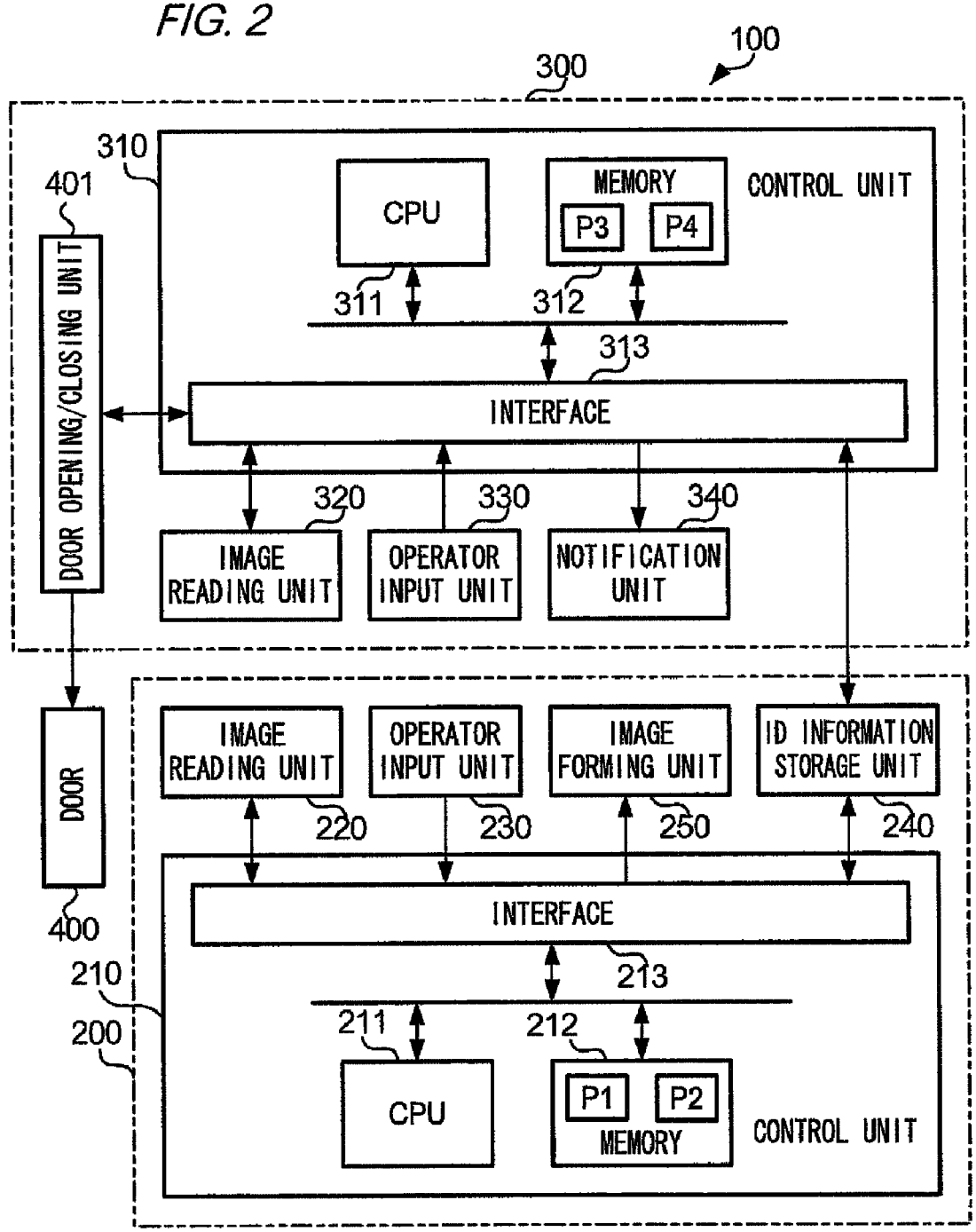
FIG. 2 is a block diagram illustrating the functional configuration of the registration device and verification device.
FIG. 16 is a diagram explaining the number of overlaps.

FIG. 2 is a block diagram illustrating the functional configuration of the registration device 200 and verification device 300. As shown in FIG. 2, the registration device 200 includes a control unit 210, an image reading unit 220, an operator input unit 230, an ID information memory 240, and an image forming unit 250. Along with controlling the operation of the image reading unit 220 and image forming unit 250, the control unit 210 executes prescribed image processing on image information acquired from the image reading unit 220. The image reading unit 220 optically reads the paper medium, in which the detectable substances are inlaid, generates image information representing the medium and supplies the image information to the control unit 210. The operator input unit 230, which includes a keyboard or another input device, or controls such as buttons, etc., accepts user input, generates control signals representing them, and supplies them to the control unit 210. The image forming unit 250 forms an image on a paper sheet based on the image information representing the image formed on the paper medium supplied by the control unit 210.

More specifically, the control unit 210 includes a CPU (Central Processing Unit) 211, a memory 212, and an interface 213. The CPU 211 executes software programs stored in the memory 212. The memory 212 includes, for instance, a ROM (Read-Only Memory), which stores various software programs, and a RAM (Random Access Memory), which operates as a work area for the CPU 211. Along with acquiring various types of information from the image reading unit 220 and operator input unit 230, the interface 213, which is a physical interface enabling information interchange with components connected to the control unit 210, supplies the various types of information to the image reading unit 220.

It should be noted that the software programs stored in the memory 212 include a basic program P1, which controls the operation of the registration device 200, and a feature quantities computation program P2, which is used for computing the feature quantities of detectable substance distribution. The processing executed by the feature quantities computation program P2 will be explained in detail below.

The image forming unit 250 will be explained next. The image forming unit 250 includes image forming units.

The image forming units are provided for each toner color, i.e. cyan (C), magenta (M), yellow (Y), and black (K), with each unit having a photoconductor drum, a charging station, an exposing station, a developing station, and a transfer station. The photoconductor drum, which is a drum-shaped member rotating at a predetermined speed about the axis thereof, is electrostatically charged to a predetermined potential by the charging station. The exposing station forms electrostatic latent images by irradiating the electrostatically charged photoconductor drum with laser light. The developing station develops toner images by causing toner to adhere to the electrostatic latent images formed on the photoconductor drum. The transfer station transfers the toner images of each color developed on the photoconductor drum onto a paper medium, which is transported from a paper supply tray simultaneously with image formation. After fusing the toner images, the paper medium is ejected from the device.

The image reading unit 220, which is provided upstream of the transfer station of the image forming unit 250 in the direction of transport of the paper medium, optically reads the paper medium transported from the paper supply tray prior to the toner image transfer by the transfer station.

Figure 3:
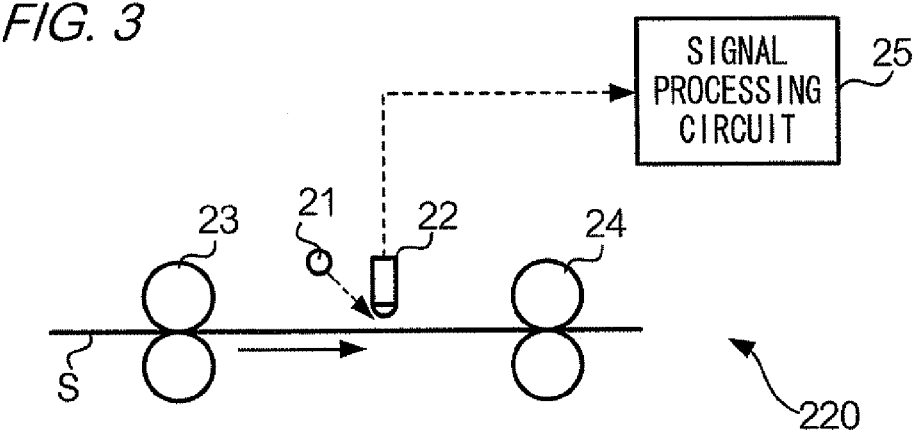
FIG. 3 is a diagram explaining the configuration of the image reading unit 220.

Specifically, the configuration of the image reading unit 220 is as shown in FIG. 3. As shown in FIG. 3, the image reading unit 220 includes a light source 21, a sensor 22, transport rollers 23, 24, and a signal processing circuit 25. The light source 21, which is, for instance, a fluorescent lamp, illuminates the position used for image capture by the sensor 22 with light. The sensor 22, which is, for instance, a contact-type CCD (Charged Coupled Device) image sensor, receives the unit of the light irradiated by the light source 21 that is reflected by the paper medium S and generates an image signal representing variations in its gray scale level. The transport rollers 23, 24 are roller-shaped members transporting the paper medium S in the direction of the arrow in the figure. The signal processing circuit 25 is a circuit that performs AD conversion and other signal processing on the image signal supplied by the sensor 21, converts the analog image signal to a digital image signal, and outputs the digital image signal. It should be noted that the light source 21, sensor 22, and paper medium S have limited widths in the direction normal to the surface of the paper in FIG. 3. Below, this direction is referred to as the "X-direction". Also, the direction normal to the X-direction, i.e. the direction of the arrow in FIG. 3, is called the "Y-direction".

Moreover, while any size and gray level of the image information can be used, it is assumed that A4 size (210 mm×297 mm) paper is read using an input resolution of 600 dots (pixels) per inch, with each dot assumed to be data representing 8-bit gray levels (256 gray levels). As for gray level values (luminance information) used at such time, "0" represents "white", and "255" represents "black". Moreover, the image information is assumed to include the entire surface of the paper medium in the image area. In other words, the image area of the image information is 4,960 ($\approx$210×600÷25.4) pixels in the X-direction and 7,016 ($\approx$297×600÷25.4) pixels in the Y-direction.

An ID information management table 241 and attribute information management table 242 are stored in the ID information memory 240.

FIG. 4 is a diagram illustrating an exemplary ID information management table 241. In the ID information management table 241, an association is established between "paper medium ID", i.e. information identifying paper media, and feature quantities of distribution of the detectable substances inlaid in the respective paper media. The feature quantities of detectable substance distribution represent information regarding the distribution of the detectable substances inlaid in the paper media, and, for instance, as shown in FIG. 4, include feature quantities such as the "total number", "number by area", "number by number of overlaps", and "number by angular range". The total number of detectable substances read from the respective paper media is recorded in the field "total number". The number of detectable substances contained in the respective units "F1"-"F9" of the paper medium is recorded in the field "number by area". The number of mutually overlapping detectable substances, as viewed in a direction normal to the surface of the paper media, is recorded in the field "number by number of overlaps", which is subdivided into "one substance", "two substances", "three or more substances". The number recorded in the field "number by angular range" is the number of detectable substances belonging to the respective angular ranges R1-R4 used when the angles between a predetermined direction on the surface of the paper media and the directions, in which the detectable substances extend, are classified into predetermined angular ranges R1-R4. It should be noted that each one of the numbers described above in relation to the detectable substances is a value obtained based on images that are determined to correspond to the detectable substances in the images read from the paper medium. The contents recorded in each of these fields, as well as the specific procedures used to obtained them, will be described in detail below.

FIG. 5 is a diagram illustrating an exemplary attribute information management table 242. As shown in FIG. 5, the attribute information management table 242 establishes an association between a "paper medium ID", i.e. information identifying a paper medium, and information on the attributes of an image (visible image) formed on the paper medium, such as "time and date of image creation", "device ID", "file ID", "number of pages", "user ID", and "taking out permitted/prohibited". The date when the image is formed on the paper medium is recorded in the field "image creation date". Identifying information (ID) assigned to the image forming device that formed the image on the paper medium is recorded in the field "device ID". Identifying information representing information (file) regarding the image formed on the paper medium is recorded in the field "file ID". The number of pages allocated to the image information is recorded in the field "number of pages". Identifying information regarding the user who instructed the image forming device to create the image is recorded in the field "user ID". Information recorded in the field "taking out permitted/prohibited" describes whether it is permissible or prohibited to take out the paper medium, to which a paper medium ID is assigned, to external spatial regions.

As shown in FIG. 4 and FIG. 5, the feature quantities of detectable substance distribution and image attribute information are associated with the respective paper medium IDs. Thus, the image attribute information can be stored in the ID information memory 240 in association with the feature quantities of detectable substance distribution.

The configuration of the verification device 300 will be now explained by referring to FIG. 2.

As shown in FIG. 2, the verification device 300 includes a control unit 310, an image reading unit 320, an operator input unit 330, a notification unit 340, and door opening/closing unit 401. Along with controlling the operation of the image reading unit 320, the control unit 310 executes prescribed image processing on image information acquired from the image reading unit 320. The image reading unit 320, which is equivalent to an ordinary scanner device, optically reads the paper medium, generates image information representing the medium and supplies the image information to the control unit 310. It should be noted that the image reading unit 320 generates image information by reading the surface of the printed material that has no images formed thereon (the printed material of the present exemplary embodiment has images formed only on one side of the paper medium). The operator input unit 330, which includes a keyboard or another input device, or controls such as buttons, etc., accepts user input, generates a control signal representing the user input, and supplies the control signal to the control unit 310. The notification unit 340 includes an LCD display and speakers to notify the user of various types of information by outputting audio signals and image signals supplied by the control unit 310. The door opening/closing unit 401, which is under the control of the control unit 310, controls the opening/closing of the door 400 in accordance with the feature quantities of detectable substance distribution.

The control unit 310 includes a CPU 311, a memory 312, and an interface 313. The CPU 311 executes software stored in the memory 312. The memory 312 includes a ROM, which stores e.g. various software programs, and a RAM, which operates as a work area for the CPU 311. Along with acquiring various types of information from the image reading unit 320 and operator input unit 330, the interface 313, which is a physical interface enabling information interchange with components connected to the control unit 310, supplies the various types of information to the image reading unit 320. The software programs stored in the memory 312 include a basic program P3 controlling the operation of the verification device 300 and a feature quantity computation/verification program P4 used for computing and verifying the feature quantities of detectable substance distribution. The processing carried out by the feature quantity computation/verification program P4 will be explained in detail below.

Here, the structure of the paper medium will be explained with reference to FIGS. 6 and 7. As shown in FIG. 6, the paper medium S is a sheet-shaped object, in which detectable substances S2 are embedded in a substrate S1. Materials such as ordinary paper media, which are composed, for instance, of cellulose, can be used for the substrate S1. The detectable substances S2, which are, for instance, wire-like metallic objects, are embedded in the substrate S1 by inlaying them therein. Moreover, the detectable substances S2 are quasi-linear rod-shaped members, their length being around 25 mm and their diameter being around 30 μm. There are from several to about 50 detectable substances S2 embedded throughout the entire paper medium S. It should be noted that the optical transmittance (or reflectivity) of the detectable substances S2 is lower than that of the substrate S1 and the diameter of the detectable substances S2 is smaller than the thickness of the paper medium S. For this reason, the positions and shapes of the detectable substances S2 can be visually ascertained to a certain extent when the paper medium S is exposed to light.

FIG. 7, which is a diagram illustrating detectable substances S2 embedded in a paper medium S, shows a cross unit of the paper medium S. For instance, as shown in FIG. 7, the detectable substances S2 are embedded in the paper medium S so as not to protrude from the surface of the paper medium. When detectable substances S2 are embedded, for instance, nearly parallel to the plane of the paper medium S, all the detectable substances S2 are viewable at practically uniform density. On the other hand, when the detectable substances S2 are embedded at an angle to the plane of the paper medium S, the density of the detectable substances S2 does not appear uniform and gradually fades away (or becomes darker).

2. Operation

The contents of the processing carried out by the verification system 100 will be described next.

2-1 Operation of Registration Device 200

Figure 8:
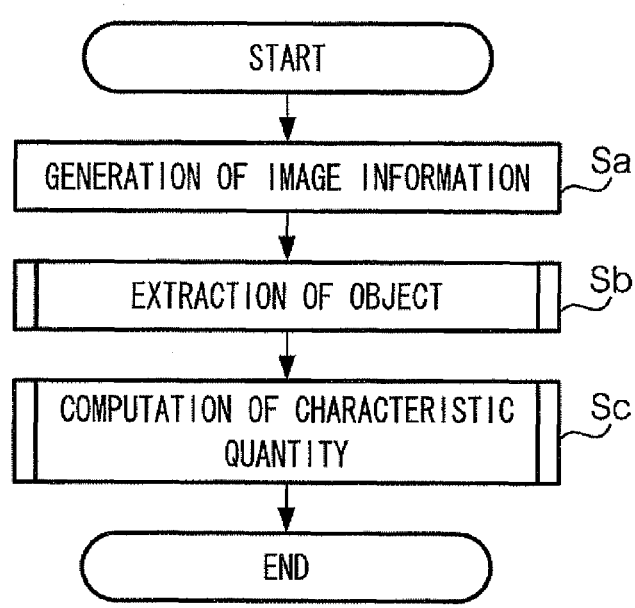
FIG. 8 is a flow chart illustrating the operation of the control unit of the registration device.

FIG. 8 is a flow chart outlining processing carried out when the feature quantities computation program P2 is executed by the control unit 210 of the registration device 200. The feature quantities computation program P2 is executed when the user performs operations (presses buttons, etc.), whose purpose is to form images on paper media, and when the control unit 210 acquires control signals corresponding to these operations. While at such time the image formation processing may consist either in producing a so-called printout or copying (making copies), processing associated with the feature quantities computation program P2 is carried out as a routine separate from image formation processing prior to image formation on the paper medium.

In FIG. 8, the control unit 210 of the registration device 200 directs the image reading unit 220 to read the paper medium and acquires the image information generated by the image reading unit 220 via the interface 213 (Step Sa). Next, the control unit 210 extracts objects, i.e. images corresponding to the detectable substances, from this image information (Step Sb). The control unit 210 then computes the feature quantities of detectable substance distribution in the paper medium based on the extracted images corresponding to the detectable substances (Step Sc). Below, detailed explanations will be provided regarding the steps Sb and Sc, during which feature processing is carried out among steps Sa-Sc.

Object Extraction Processing

Figure 9:
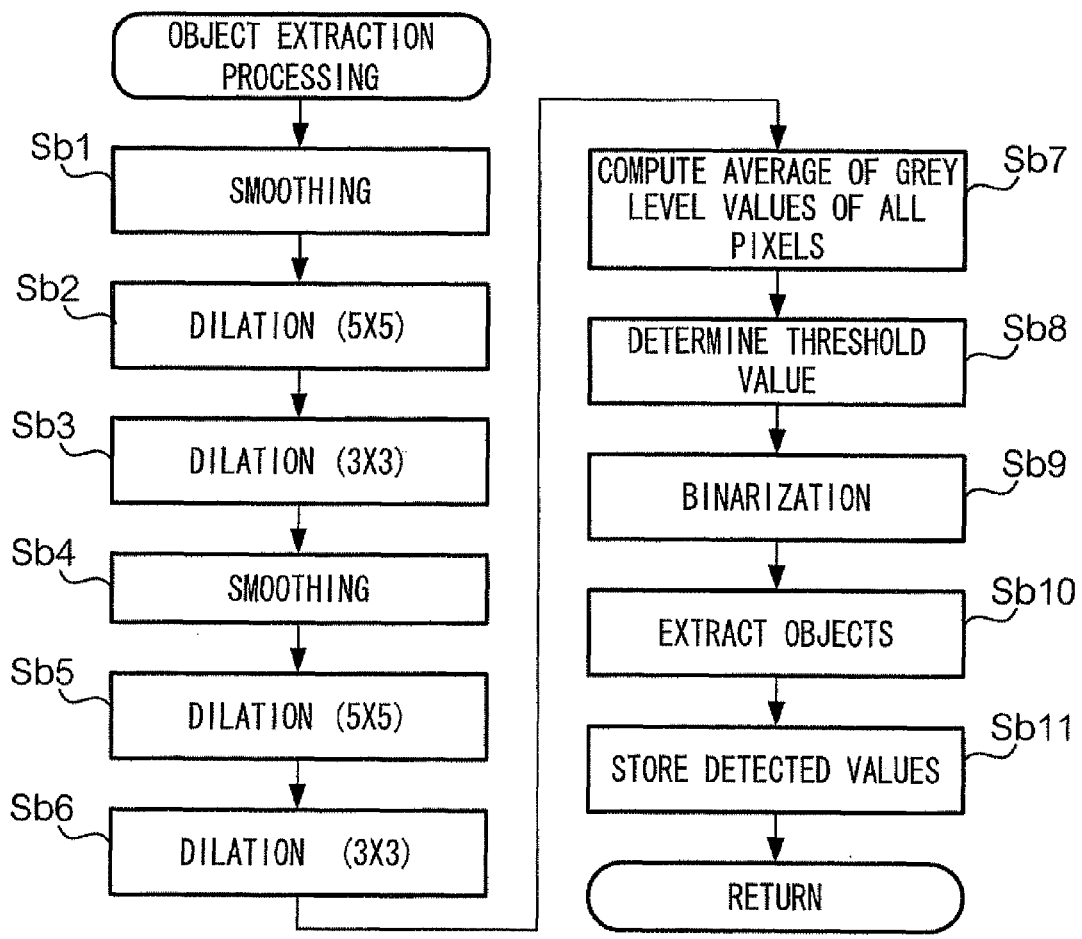
FIG. 9 is a flow chart illustrating object extraction processing by the control unit of the registration device.

FIG. 9 is a flow chart illustrating the object extraction processing carried out in Step Sb. The explanations below will refer to the same drawing. First of all, the control unit 210 carries out smoothing processing on the image information generated by the image reading unit 220 (Step Sb1). This operation, which is performed in order to reduce grey scale level differences in the substrate portion, is implemented, for instance, by applying a smoothing filter of a predetermined size. Subsequently, the control unit 210 executes expansion processing on the image information (Step Sb2). This operation, which is performed to accentuate the portions where the detectable substances are embedded, involves referring to other pixels (hereinafter referred to as "neighboring pixels") in the vicinity of a pixel of interest, and switching the grey level value of the pixel of interest to the grey level value of a pixel whose grey level value is greater (i.e. darker) than the grey level value of the pixel of interest, among the neighboring pixels, if there is such a pixel.

Figure 10A:
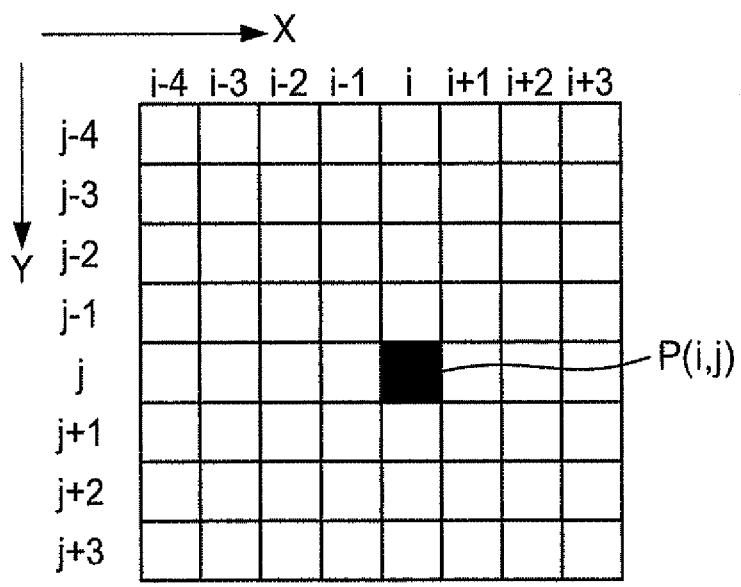
FIGS. 10A to 10C are diagrams explaining expansion processing.
Figure 10B:
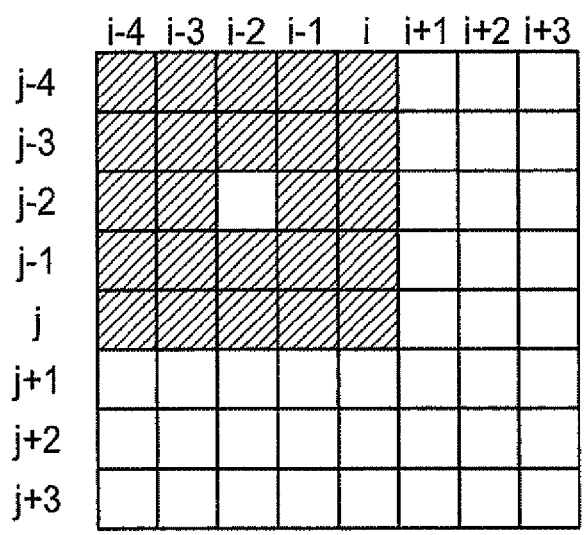
Figure 10C:
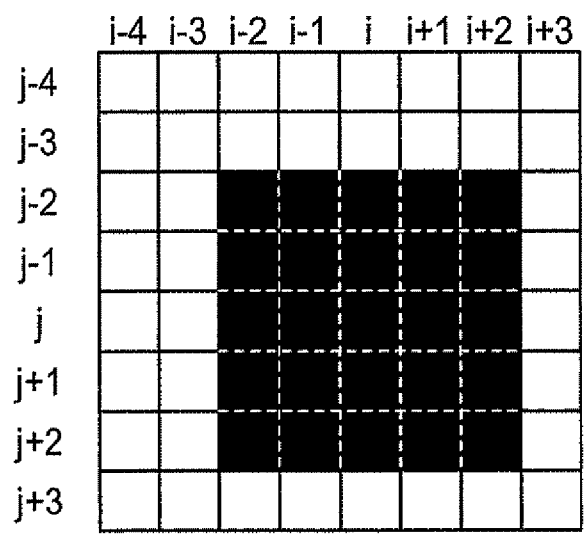

Let us explain the expansion processing using a specific example. For instance, let us consider image information having a pixel P (i,j), such as the one shown in FIG. 10A. It should be noted that, as used herein, "i" represents a coordinate value in the X direction and "j" represents a coordinate value in the Y direction. In addition, for convenience of explanation, the grey level value of the pixel P is assumed to be "1" and the grey level values of all the other pixels are assumed to be "0". If such image information is subjected to expansion processing using, for instance, two lines of pixels above and below and to the left and right of the pixel of interest and if the pixel P (i-2, j-2) is used as the pixel of interest, then the neighboring pixels will be the pixels indicated by hatching in FIG. 10B. In other words, the neighboring pixels will be the following 24 pixels: pixels P(i-4,j-4)~P(i,j-4), P(i-4,j-3)~P(i,j-3), P(i-4,j-2)~P(i-3,j-2), P(i-1,j-2)~P(i,j-2), P(i-4,j-1)~P(i,j-1), and P(i-4,j)~P(i,j). The grey level value of the pixel of interest P (i-2, j-2) will then be changed from "0" to "1" because the neighboring pixels include pixel P (i, j), whose grey level value is "1". If such processing is performed on all pixels, as a result of the processing, as shown in FIG. 10C, the grey level value of the 24 pixels in the vicinity of the pixel P (i,j) will be "1".

It should be noted that the number of the neighboring pixels during the expansion processing may be selected in an arbitrary manner. Although two lines of pixels above and below and to the left and right of the pixel of interest were used as "neighboring pixels" in the example, a single line may be used as well. Below, expansion processing using two lines of pixels above and below and to the left and right of the pixel of interest as "neighboring pixels" will be called "5×5 pixel expansion processing" in the sense that the operation uses 5×5 pixels, with the pixel of interest in the center. Moreover, in a similar manner, expansion processing using one line of pixels above and below and to the left and right of the pixel of interest as "neighboring pixels" will be referred to as "3×3 pixel expansion processing" in the sense that the operation uses 3×3 pixels, with the pixel of interest in the center. Namely, the expansion processing executed in Step Sb2 is 5×5 pixel expansion processing.

Returning now to the flow chart of FIG. 9. After executing the expansion processing of Step Sb2, the control unit 210 carries out expansion processing (Step Sb3) again. The expansion processing executed at such time is 3×3 pixel expansion processing. Subsequently, the control unit 210 repeats the smoothing processing and expansion processing carried out in Step Sb1, Sb2, and Sb3 in the same order (Steps Sb4, Sb5, and Sb6).

Next, the control unit 210 computes an average of the grey level values of all the pixels contained in the image information (Step Sb7). Based on the average value computed at such time, the control unit 210 determines a threshold value Th1 for binarization processing in the following stage (Step Sb8). The relationship between the threshold value Th1 and the average value is arbitrary and may be set such that, for instance, a value obtained by multiplying the average value by a predetermined coefficient is used as the threshold value Th1. In this exemplary operation, however, a value obtained by adding "22" to the average value is used as the threshold value Th1.

Using the thus determined threshold value Th1, the control unit 210 then carries out binarization processing (Step Sb9). Namely, the control unit 210 performs a substitution, wherein the grey level values of the pixels having a grey level value smaller than the threshold value Th1 are set to "0" and the grey level values of all the pixels having a grey level value equal or greater than the threshold value Th1 are set to "1".

After carrying out the binarization processing, the control unit 210 performs an operation, during which it extracts objects based on the image information obtained after the binarization (Step Sb10). During this operation, a block of contiguous pixels with a grey level value of "1" is considered as a single object as is labeled as such. At the same time, the length, perimeter, and area of the respective objects are computed and the objects, whose length, perimeter and area do not satisfy predetermined threshold values, are eliminated as objects extracted as a result of sheet float and uneven illumination, i.e. as noise. In the present exemplary embodiment, the threshold values for the length, perimeter and area are, respectively, "236", "600", and "7,000". It should be noted that the unit of all these threshold values is "pixels". Namely, the threshold value Th1 for length is about 10 (≈236÷600× 25.4) mm. Moreover, when the term "objects" is used below, it refers to objects extracted in Step Sb10, i.e. objects without the noise present in the image information.

Figures 11, 12:
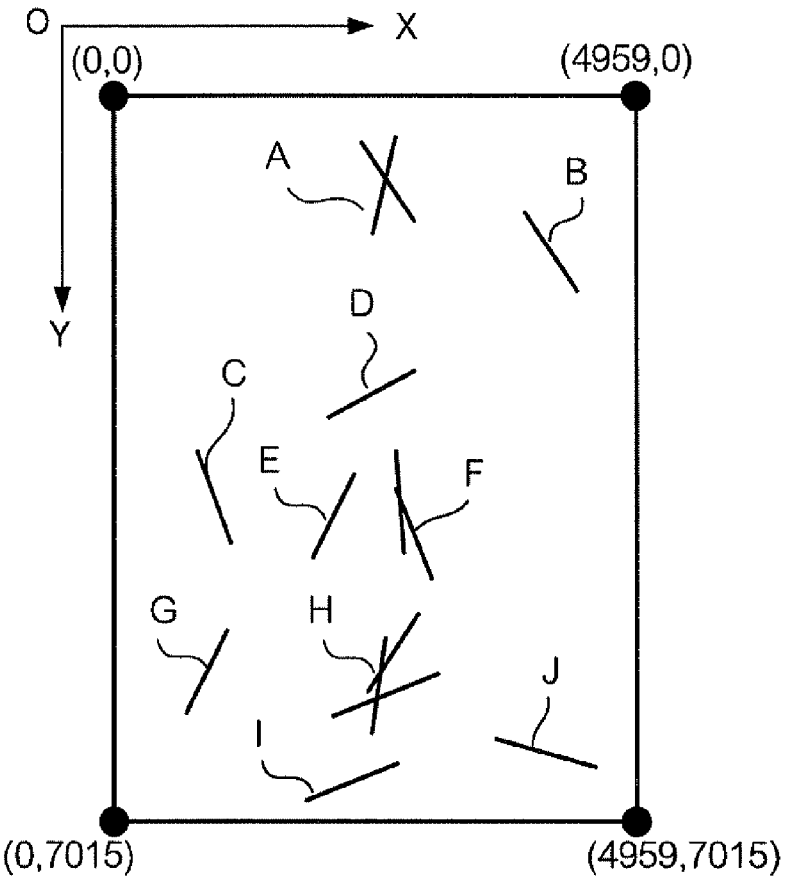
FIG. 11 is a diagram illustrating an exemplary image containing objects.
FIG. 12 is a diagram detected values computed by the control unit of the registration device.

In FIG. 11, which illustrates how the extracted objects are extracted from the image information, the symbols A-J are used as identifying information for identifying objects. The control unit 210 defines coordinate axes X and Y in the X direction and Y direction using a predetermined point of origin O as a reference. Here, the top left end of the image area is used as the origin O. The coordinate values in this coordinate system correspond to the number of pixels in the image area, with the X-coordinate using values ranging from "0" to "4959" and the Y-coordinate using values ranging from "0" to "7015". The control unit 210 computes the length, perimeter, area, centroid, and angle of the respective objects and stores them in the memory 212 as detected values for each object (step Sb11). FIG. 12 shows detected values computed by the control unit 210 for each object using the image information illustrated in FIG. 11. In FIG. 12, "centroid (X)" and "centroid (Y)" are the X-coordinates and Y-coordinates of the centers of gravity of the objects. In addition, the term "angle" refers to an angle, measured in "degrees", between a predetermined direction (in the present exemplary embodiment, the direction of the coordinate axis Y) and the longitudinal direction of an object (i.e. the direction, in which a detectable substance extends). In addition, "pixels" are used as the unit of measurement for length, perimeter, and area.

Feature Quantity Computation Processing

Next, detailed explanations will be provided regarding the feature quantity computation processing of Step Sc in FIG. 8. The processing is used to compute the feature quantities of distribution of the detectable substances embedded in a paper medium based on the detected values stored in the memory during the object extraction processing.

Figure 13:
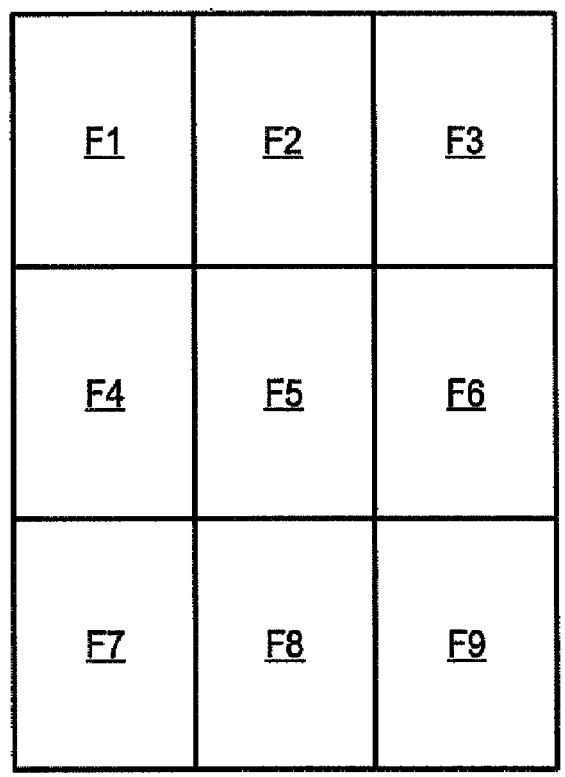
FIG. 13 is a diagram illustrating the method used for division into image areas.

During the feature quantity computation processing, the control unit 210 divides the image represented by the image information into multiple images (referred to as "partial images") and computes feature quantities of distribution of the detectable substances for each partial image area. Specifically, as shown in FIG. 13, the control unit 210 divides the entire image area into a total of nine partial image areas F1-F9 arranged in a 3×3 grid. Dividing the image shown in FIG. 11 into the partial image areas F1-F9 produces the image illustrated in FIG. 14. At such time, lines X=2338, 4676 and lines Y=1653, 3306 serve as boundaries between neighboring partial image areas.

Figure 15:
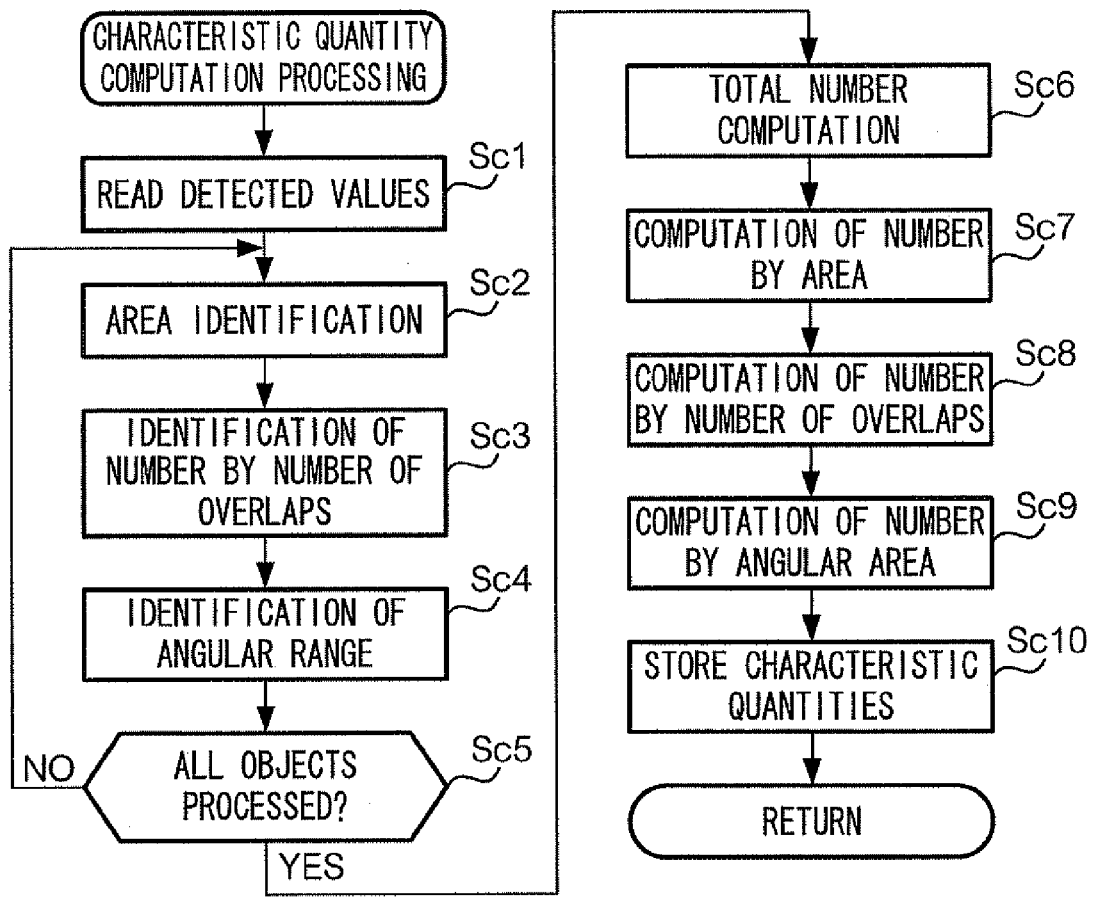
FIG. 15 is a flow chart illustrating feature quantity computation processing by the control unit of the registration device.

FIG. 15 is a flow chart illustrating the feature quantity computation processing carried out in Step Sc. The explanations below will refer to the same drawing. First of all, the control unit 210 reads detected values for the objects stored by the memory 212 (Step Sc1). Subsequently, the control unit 210 computes the feature quantities of distribution of the detectable substances.

Figure 14:
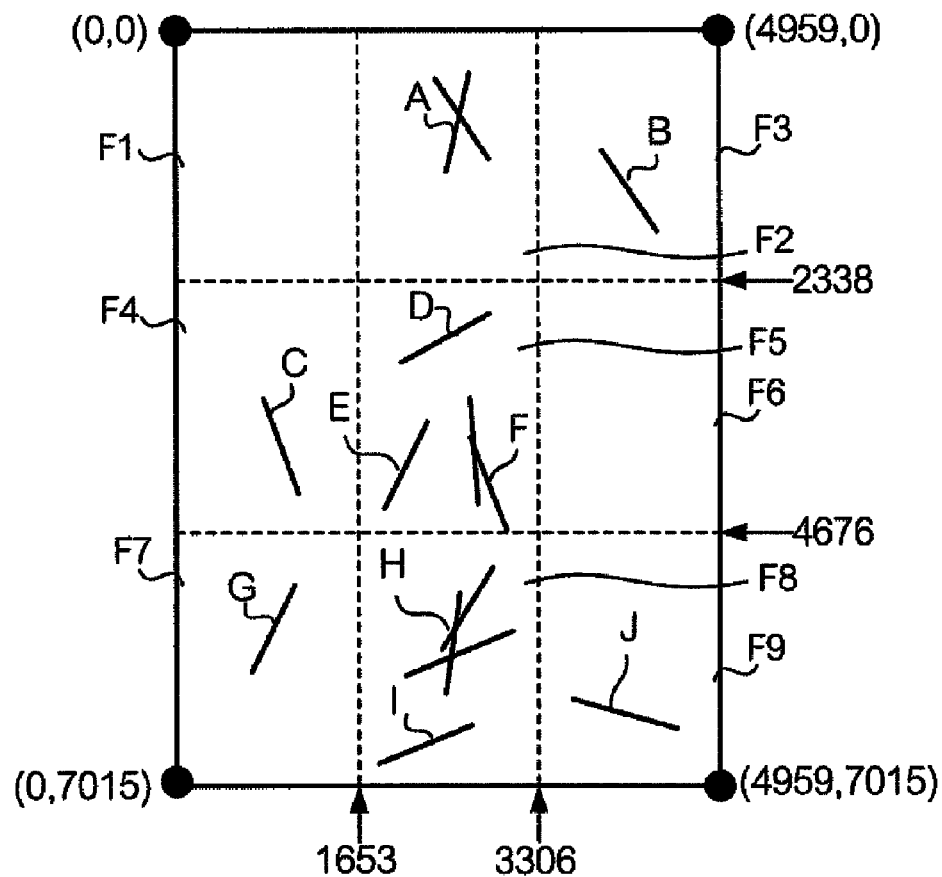
FIG. 14 is a diagram illustrating an exemplary image divided into image areas.

First of all, the control unit 210 identifies the partial image area among the partial image areas F1-F9, to which a particular object of interest belongs (Step Sc2). Here, a comparison is carried out between the coordinate values of the centroid of each object and the coordinate values of each partial image area and the partial image area, to which the centroid belongs, is identified as the partial image area, to which the object belongs. Referring to FIG. 14 as an example, object A belongs to the partial image area F2 and object B belongs to the partial image area F3.

Next, the control unit 210 identifies the number of overlapping detectable substances in the objects (Step Sc3).

More specifically, the control unit 210 computes the number of overlapping substances based on the area or perimeter of the extracted objects. Since the length of the detectable substances is approximately 25 mm, the area of a single detectable substance is 10,000-33,000 (pixels) and the perimeter of a single detectable substance is 850-1500 (pixels). Thus, the control unit 210 sets the number of overlapping substances to "2" if the area of an object is not less than 33,000 and less than 55,000 or if the perimeter of an object is not less than 1500 and less than 3000. It sets the number of overlapping substances to "3" or more if the area of an object is not less than 55,000 or if the perimeter of an object is not less than 3000. In addition, the control unit 210 sets the number of overlapping substances to "1" if the area of an object is less than 33,000 or if the perimeter of an object is less than 1500. As a result, as shown in FIG. 16, when a detectable substance is found to exhibit no overlaps the number of overlapping substances is set to "1", the number of overlapping substances is set to "2" when two detectable substances are found to have formed a single object by overlapping, and the number of overlapping substances is set to "3" or more when three detectable substances are found to have formed a single object by overlapping.

Figure 17:
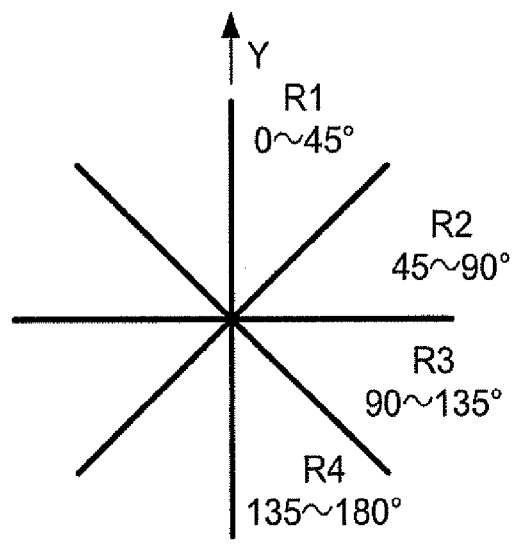
FIG. 17 is a diagram explaining the angular ranges.

Subsequently, in FIG. 15, the control unit 210 identifies angular ranges representing the angles of the objects (Step Sc4). Here, FIG. 17 is a diagram explaining the angular ranges. The angle of an object is defined as the angle between the longitudinal direction of an object and the coordinate axis Y. As shown in FIG. 17, if the angle of an object is not less than 0 and less than 45 degrees, the object belongs to the angular range R1; if the angle of an object is not less than 45 and less than 90 degrees, the object belongs to the angular range R2; if the angle of an object is not less than 90 and less than 135 degrees, the object belongs to the angular range R3, and if the angle of an object is not less than 135 and less than 180 degrees, the object belongs to the angular range R4. Referring to FIGS. 12 through 14 as an example, objects A, B, and C belong to the angular range R4 and object D belongs to the angular range R2.

Then, in FIG. 15, the control unit 210 makes a determination as to whether all the objects contained in the image information have been subjected to the processing of the processing Steps Sc2~Sc4 described above (Step Sc5). The control unit 210 carries out the operation of computing the feature quantities of distribution of the detectable substances if it is determined that the partial image areas and angular ranges, to which the objects belong, as well as the number of overlapping substances, have been identified for all the objects (Step Sc5; Yes), as shown in FIG. 18.

The control unit 210 computes the total number of objects belonging to the entire image area represented by the image information (Step Sc6). Here, the total of the objects A-J is 10. Subsequently, the control unit 210 computes the total number of objects belonging to each partial image area F1-F9 (Step Sc7). Referring to FIG. 18 as an example, no objects belong to the partial image area F1 and the number is "0". For the partial image area F2, the number is "1" because object A belongs to this area. Moreover, objects D, E, and F belong to the partial image area F5, and its total number is "3". Subsequently, the control unit 210 computes the "number by number of overlaps" for the entire image area represented by the image information (Step Sc8). Since the number of overlapping detectable substances has been identified in Step Sc3, the control unit 210 classifies them into groups, in which the number of overlapping substances is "one", "two", and "three or more", and computes the number of objects for each one.

Next, the control unit 210 computes the total number of objects belonging to the respective angular ranges R1-R4 (Step Sc9). Referring to FIG. 18 as an example, due to the fact that objects E, G, and H belong to the angular range R1, the number for the range is "3", and since objects D and I belong to the angular range R2, the number for the range is "2". It is "1" for the angular range R3 because object J belongs to the angular range R3. It is 4 for the angular range R4 because objects A, B, C and F belong to the angular range R4.

After computing the feature quantities of distribution of the detectable substances in the manner, the control unit 210 writes them to the ID information management table 241 of the ID information memory 240 (Step Sc10). FIG. 19 shows the feature quantities of distribution of the detectable substances recorded in the ID information management table 241 at such time. The contents of the ID information management table 241 illustrated in FIG. 4 represent a collection of feature quantities of distribution of the detectable substances for each paper medium.

After undergoing the processing, the paper medium is supplied to the image forming unit 250 and an image (visible image) is formed on the paper medium by the image forming unit 250. At such time, the control unit 210 writes the "time and date of image creation", "device ID", "file ID", "number of pages", "user ID", and "taking out permitted/prohibited" to the attribute information management table 242. Because the "time and date of image creation" is the current time and date and the "device ID" is the device ID assigned to the registration device 200, the control unit 210 can simply write the "time and date of image creation" and the "device ID". Moreover, since the "file ID", "number of pages", and "user ID" constitute information that can be identified by referring to the image data representing the image formed on the paper medium and its header, the control unit 210 can simply write the "file ID", "number of pages", and "user ID". Additionally, since the "taking out permitted/prohibited" field contains information recorded in the header of the image data or designated when the user issues an instruction to perform an image forming operation, the control unit 210 can simply refer to this information and write the information to the attribute information management table 242.

2-2 Operation of Verification Device 300

The operation of the verification device 300 will be explained next.

When a user intending to carry a printed material outside places the printed material on the verification device 300 and performs an operation (pressing a button, etc.) used for verification, the control unit 310 of the verification device 300 executes the feature quantity computation/verification program P4. It should be noted that the explanation of the operation of the verification device 300 provided below refers to a case of verifying feature quantities (see FIG. 19) computed for the image illustrated in FIG. 11 against the contents (feature quantities) of the ID information management table 241 illustrated in FIG. 4.

First of all, the control unit 310 directs the image reading unit 320 to read the printed material and acquires the image information generated by the image reading unit 320 via the interface 313. Next, the control unit 310 executes an object extraction operation and executes feature quantity computation. Since the procedure involving the reading of the printed material, object extraction processing, and feature quantity computation carried out by the control unit 310 (processing corresponding to the Steps Sa, Sb, and Sc of FIG. 7) is the same as the processing executed by the control unit 210 of the registration device 200, its explanation is omitted.

After computing the feature quantities based on the printed material, the control unit 310 executes verification processing involving verifying the computed feature quantities against the feature quantities recorded in the ID information management table 241 of the ID information memory 240.

Figure 20:
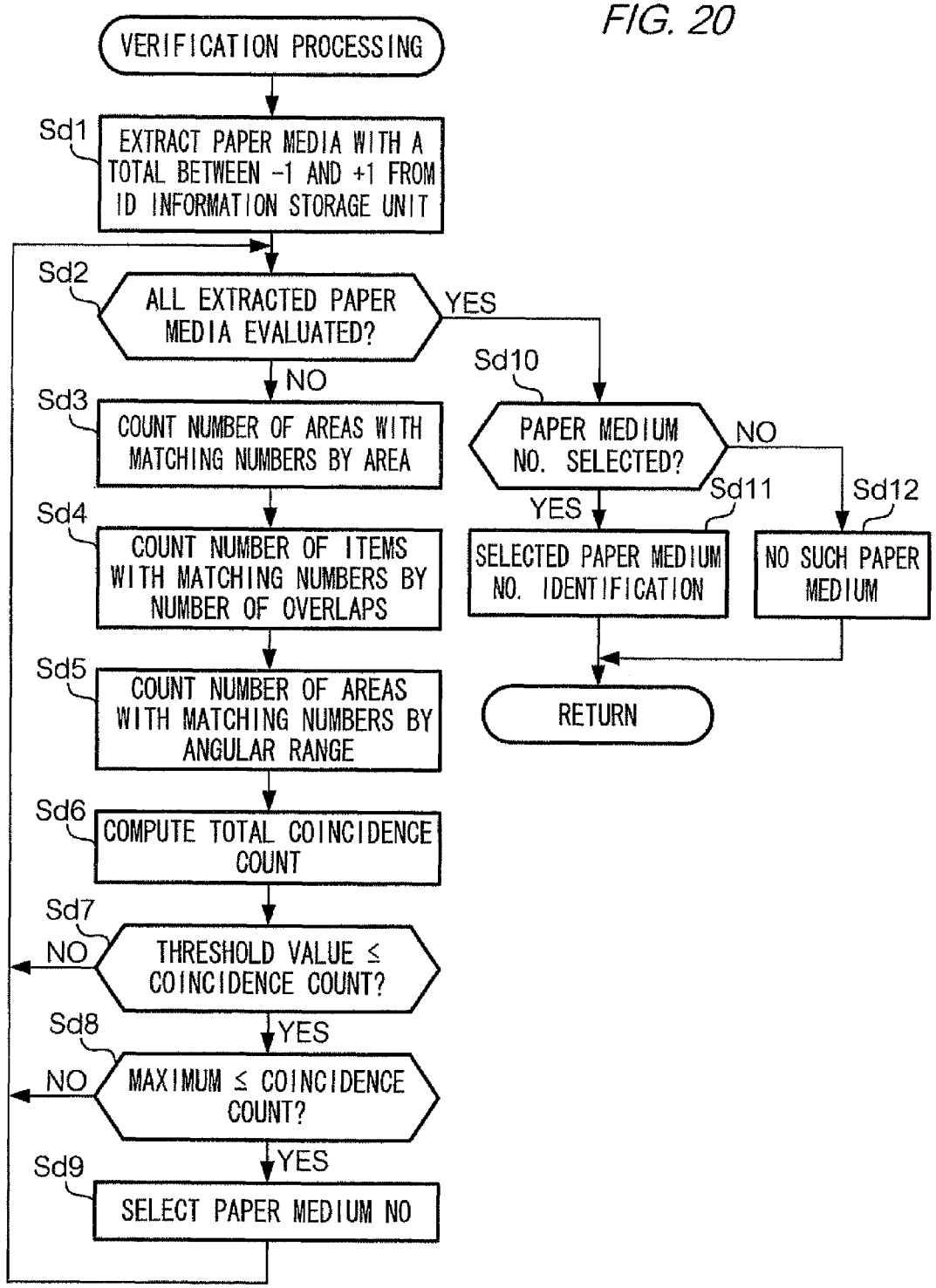
FIG. 20 is a flow chart illustrating verification processing by the control unit of the verification device.

FIG. 20 is a flow chart illustrating the verification processing performed by the control unit 310. It will be explained below by referring to the same drawing.

First of all, paper medium IDs, for which the total number of objects is the same or differs only by one object, are extracted from the ID information management table 241 (Step Sd1) by the control unit 310. Since the total number of objects contained in the image illustrated in FIG. 11 is 10, the control unit 310 only extracts paper medium IDs "2", "6", "7", "8", and "9", which have "9", "10", or "11" in the "total number" field. When a large number of information items are stored in the ID information management table 241, the control unit 310 carries out verification processing for all the feature quantities recorded there, as a result of which the time required for processing becomes excessively long. Accordingly, the control unit 310 decreases the verification processing burden by focusing on paper medium IDs, for which the total number of objects is approximately the same.

The control unit 310 determines whether feature quantities have been verified for all the paper medium IDs (Step Sd2). Since the feature quantity verification has not been completed for some of the paper medium IDs (Step Sd2: "NO"), the processing performed by the control unit 310 advances to Step Sd3. In Step Sd3, the control unit 310 focuses on a paper medium ID among the extracted paper medium IDs and counts the number of areas with matching numbers of objects among the partial image areas F1-F9 based on the values recorded in the "number by area" field of the paper medium ID (Step Sd3). Subsequently, the control unit 310 counts the number of items with matching numbers among "one", "two", and "three or more" based on the values recorded in the "number by number of overlaps" field of the paper medium IDs (Step Sd4). Then the control portion 310 counts, for the angular ranges R1-R4, the number of areas, for which the number of objects respectively belonging thereto is the same (Step Sd5). The control portion 310 then computes a total (referred to as "coincidence count" below) of the number of areas or items counted in Steps Sd3-Sd5 (Step Sd6). Specifically, the coincidence count is "3" for paper medium ID "2" and "16" for paper medium ID "9".

The control unit 310 determines whether the coincidence count is equal to, or higher than a predetermined threshold value (Step Sd7). The threshold value used here is, for example, 80%. In other words, even if the feature quantities are not complete, a match is postulated if the coincidence count exceeds a certain level. If the control unit 310 determines that the coincidence count is less than the threshold value (Step Sd7: "NO"), then a determination is made to the effect that the printed material is not the same thing as the paper medium corresponding to the paper medium ID of interest and the process goes back to the Step Sd2.

On the other hand, if the control unit 310 determines that the coincidence count is equal to, or higher than the threshold value (Step Sd7: "YES"), a determination is made as to whether the coincidence count has reached maximum value at the present moment (Step Sd8). Namely, if the control unit 310 identifies a paper medium ID with a larger coincidence count and the coincidence count is smaller than the maximum value (Step Sd8: "NO"), a determination is made to the effect that it is not the same thing as the paper medium corresponding to the paper medium ID of interest, the process goes back to the Step Sd2, focuses on another paper medium ID, and the processing is repeated. On the other hand, if the control unit 310 determines that the coincidence count of the paper medium ID of interest is larger than the maximum value (Step Sd8: "YES"), the paper medium ID is selected (Step Sd9), the process goes back to Step Sd2 and focuses on another paper medium ID, and the processing is repeated.

If the control unit 310 determines that verification has been performed for all the paper medium IDs (Step Sd2: "YES"), a determination is made as to whether a paper medium ID has been selected in Step Sd9 (Step Sd10). Because the control unit 310, as described above, selected the paper medium ID "9" in Step Sd9 (Step Sd10: "YES"), paper medium ID "9" is identified. In other words, the printed material is identified as the same thing as a paper medium corresponding to the paper medium ID "9". The control unit 310 then makes a determination as to whether to authorize the taking out of the printed material subject to verification processing based on the identified paper medium ID and the attribute information management table 242 (see FIG. 5) stored in the ID information memory 240. Referring to FIG. 5, the "taking out authorization" field associated with the paper medium ID "9" contains the word "prohibited". Accordingly, the control unit 310 outputs a control signal to the door opening/closing unit 401 so as to keep the door 400 closed in order to prohibit taking out of the paper medium. At such time, the control unit 310 may display information on various attributes corresponding to the paper medium ID "9" on the notification unit 340 or may write the information to a predetermined file stored in the memory, not shown.

On the other hand, if in Step Sd10 the control unit 310 determines that no paper medium IDs could be selected in Step Sd9 (Step Sd10: "NO"), it is determined that the printed material subject to verification processing has not been registered by the registration device 200 and there is no corresponding paper medium (Step Sd12). Accordingly, the control unit 310 determines that the taking out of the paper medium to external spatial regions should be authorized and outputs a control signal to so as to open the door 400. At such time, the control unit 310 may output a control signal to the notification unit 340 to cause the notification unit 340 to notify the user with an audio signal so as to prompt the user to register using the registration device 200.

B. Exemplary Embodiment 2

Exemplary Embodiment 2 of the present invention will be explained next. In Exemplary Embodiment 2, the feature quantity computation processing and verification processing operations are different from the Exemplary Embodiment 1, while other operations and device configuration are the same. Thus, detailed explanations will be provided below with regard to the feature quantity computation processing and verification processing.

In the present exemplary embodiment, the feature quantity computation processing performed in Step Sc of FIG. 8 is executed using a Hough transform operation.

Here, first of all, explanations will be provided regarding the Hough transform operation. Assuming that the position of a pixel in image information, in which gray level values are represented by binary values, is represented by an X-coordinate and an Y-coordinate and designating as ρ the distance from the origin for a straight line passing through the coordinates (x, y) and making an angle of θ with the X-axis, in X-Y coordinates, all straight lines passing through a pixel located at the coordinates (x, y) can be represented using the following formula (1).

$$\rho = x \cos \theta + y \sin \theta \quad (0 \leq \theta < \pi) \tag{1}$$

Figure 21:
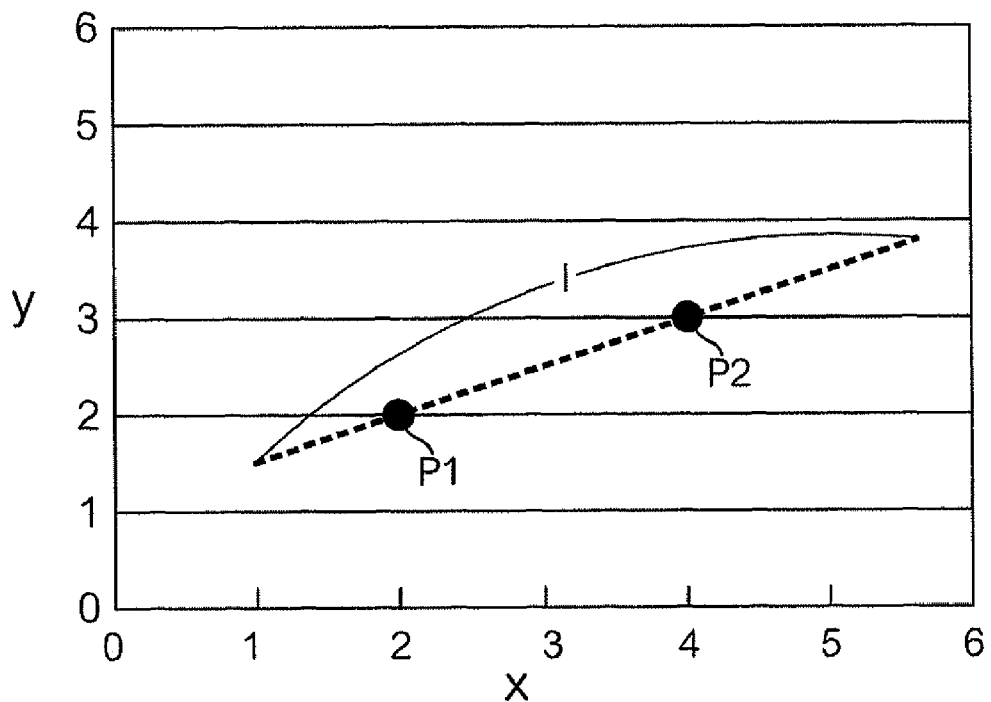
FIG. 21 is a diagram explaining Hough transform processing.
Figure 22:
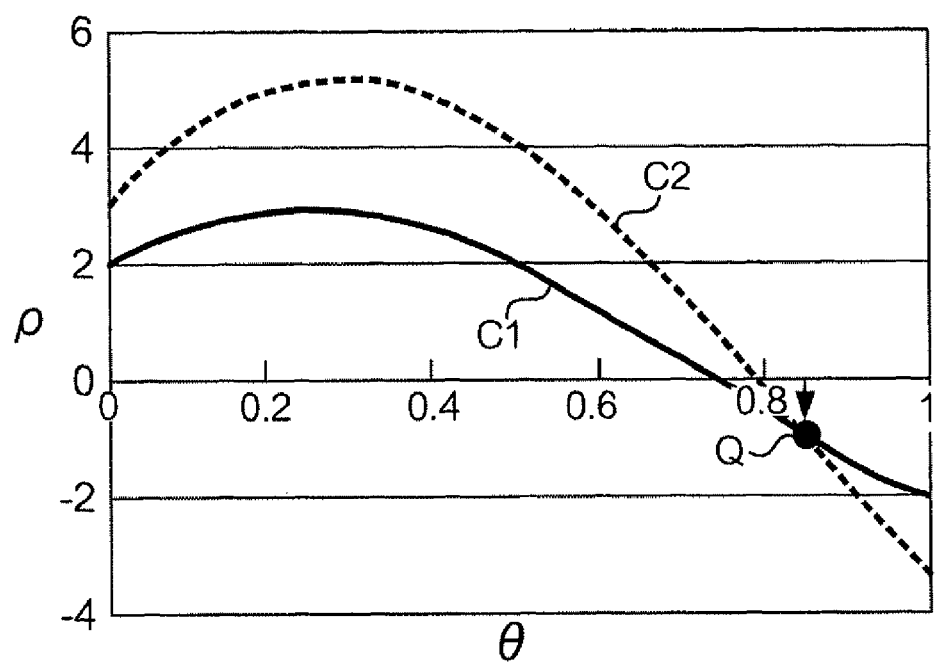
FIG. 22 is a diagram explaining Hough transform processing.

For instance, for pixels located at coordinates P1 (x1, y1) and P2 (x2, y2) along a straight line 1, as shown in FIG. 21, if the "θ" of formula (10) is varied from 0 to π and the "ρ" produced by the changes in the "θ" is plotted in ρ–θ coordinates as shown in FIG. 22, all straight lines passing through a certain pixel can be represented as curves in the ρ–θ coordinates (in polar coordinates). These curves are called Hough curves, with the Hough curve corresponding to the coordinates P1 called curve C1 and the Hough curve corresponding to the coordinates P2 called curve C2. The process of obtaining Hough curves in this manner is called a Hough transform.

As shown in FIG. 22, the Hough curves C1, C2 are uniquely identified by the position and incline of the straight line 1. Furthermore, there is a point of intersection Q ($\rho_0$, $\theta_0$) between the Hough curves C1 and C2, and, if the values of $\rho_0$ and $\theta_0$ at the point of intersection Q are obtained, the straight line 1 can be uniquely identified based on these values as well. In other words, all of the Hough curves produced based on pixels located at any coordinates, so long as they are points on the straight line 1, pass trough the point of intersection Q ($\rho_0$, $\theta_0$).

Next, explanations will be provided regarding the feature quantity computation processing carried out based on the Hough transform technique explained above.

First of all, the control unit 210 of the registration device 200 generates image information by reading a paper medium, after which binarization processing is carried out using a predetermined threshold value. Next, the control unit 210 obtains Hough curves by performing a Hough transform on the image information. As described above, the detectable substances are quasi-linear in shape, and, therefore, the images corresponding to the detectable substances are also quasi-linear in shape. In other words, multiple Hough curves expressed based on the pixels of an image corresponding to a certain detectable substance will intersect at certain coordinates (point of intersection) in the Hough plane. Accordingly, if the control unit 210 checks the coordinates representing a point of intersection of multiple Hough curves (i.e. coordinates with a large number of votes for an intersection point) in the Hough plane, it will be able to obtain information corresponding to the position and incline of the detectable substance.

Moreover, since the number of the detectable substances inlaid in the paper medium is limited to a number within a certain range, the control unit 210 extracts only a predetermined number of coordinates (ρ, θ) corresponding to the number of the detectable substances, starting with coordinates having higher numbers of votes; they are subsequently recorded in the ID information memory 240 as the feature quantities of distribution of the detectable substances. Moreover, if a detectable substance is slightly curved, the points of intersection of the multiple Hough curves do not completely coincide in the Hough plane. In such a case, multiple intersection points concentrate within a small region and, therefore, if the number of votes within a predetermined region is considered, it can be extracted as a feature quantity as well.

The verification processing performed by the verification device 300 will be explained next.

During the verification processing, in the same manner as in case of the registration device 200, the control unit 310 of the verification device 300 generates image information, which is obtained by reading the printed material, and then performs binarization processing and Hough transform processing. Then the control unit 310 extracts coordinates by starting from coordinates with larger numbers of votes in the Hough plane, and uses them as feature quantities of distribution of the detectable substances.

Next, to verify the feature quantities computed based on the printed material against the feature quantities stored in the ID information memory 240, the control unit 310 selects, one by one, coordinates of points from the feature quantities and computes the corresponding Euclidean distances in the Hough plane. If the Euclidean distances are 0 or smaller than a predetermined value, the control unit 310 then makes a determination to the effect that the positions and inclines of the images corresponding to the detectable substances coincide. If a paper medium ID exists, for which the coincidence count is equal or greater than the predetermined value, the control unit 310 makes a determination that the printed material and the paper medium corresponding to the paper medium ID are the same thing. The subsequent processing is identical to the Exemplary Embodiment 1.

C. Exemplary Embodiment 3

Exemplary Embodiment 3 of the present invention will be explained next. Exemplary Embodiment 3 differs from the Exemplary Embodiment 1 in terms of its operation, but the configuration of the device is the same. The explanations below will focus on the operation. In the present exemplary embodiment, the verification device 300 performs verification processing using a cross-spectrum. Namely, verification is carried out based on the degree of similarity between two pieces of image information based on a correlation between image information generated form a registered paper medium and image information generated from a printed material.

First of all, the control unit 210 of the registration device 200 generates image information by reading a paper medium, after which binarization processing is carried out using a predetermined threshold value. It is assumed that, as a result of this processing, white pixels are represented using a grey level value of "0" and black pixels are represented using a grey level value of "1". Next, the control unit 210 divides the image represented by the image information into multiple partial image areas and generates superimposed image information by superimposing these partial image areas. It should be noted that the reason for the use of the superimposed image information consists in the increased amount of computation and longer times required for processing when verification processing is carried out using a cross-spectrum for the entire image area. Using the superimposed image information produced by superimposing partial image areas obtained by dividing the image area, as it is done in the present exemplary embodiment, reduces the amount of computation and processing time required for processing while preserving the feature quantities associated with the detectable substances in the superimposed image information.

Figure 23:
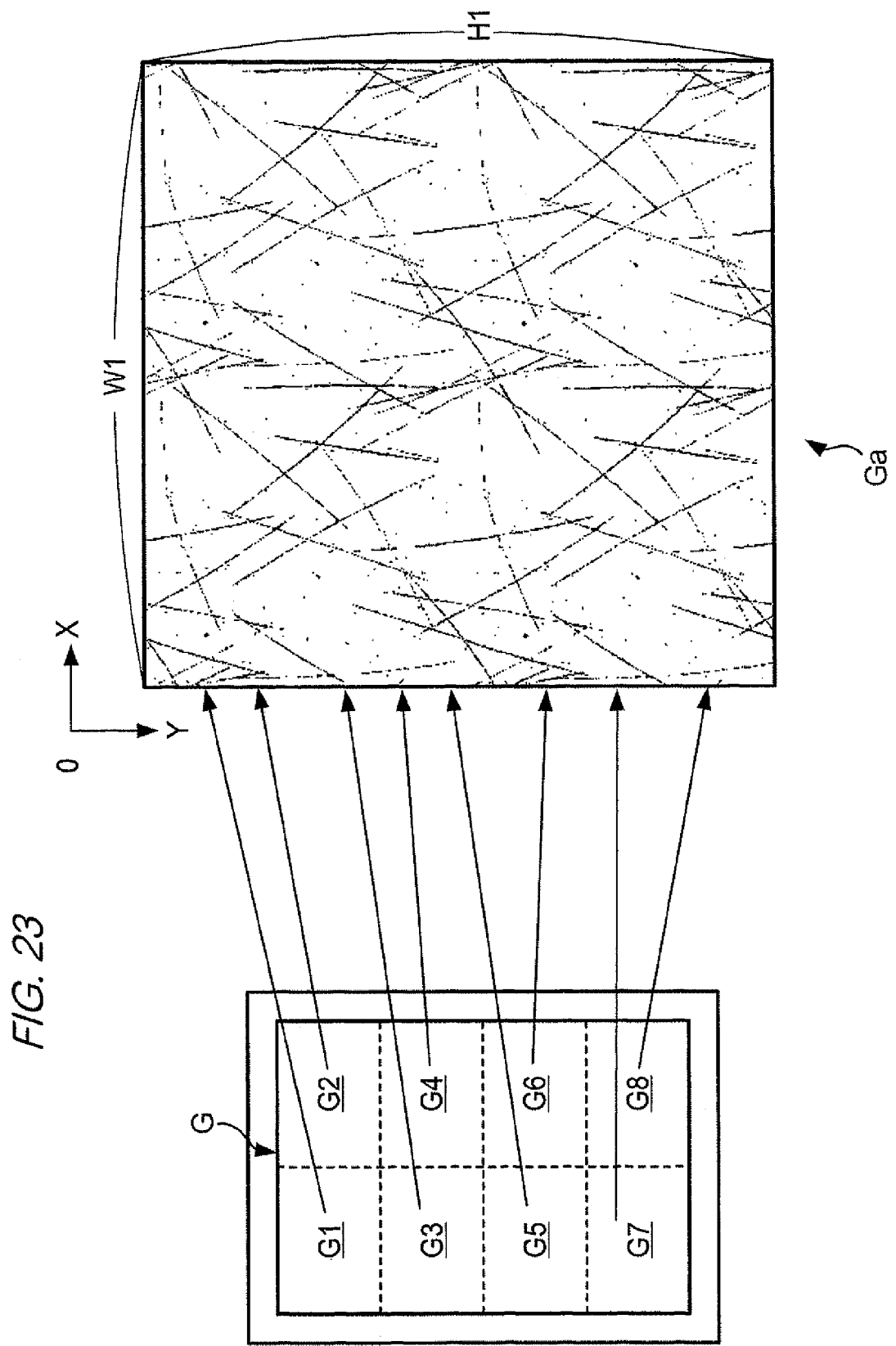
FIG. 23 is a diagram schematically representing the method used for generating superimposed image information.

FIG. 23 is a diagram schematically representing a method used for generating superimposed image information. The control unit 210 divides the image G represented by certain image information into a grid of image areas, producing a total of eight partial image areas with an X-direction length of W1 and a Y-direction length of H1. It should be noted that, in the present exemplary embodiment, it is assumed that as a result of the division each of the partial image areas has 256 pixels in the main scan direction and in the auxiliary scan direction, and image areas beyond that are not used for verification processing. The control unit 210 then generates superimposed image information by superimposing the partial images of all the partial image areas produced by division. In FIG. 23, the partial images G1-G8 of the eight partial image areas are superimposed as shown by the arrows in the drawing, thereby producing superimposed image information representing a superimposed image Ga. Specifically, the control unit 210 computes a logical sum of the grey level values of the pixels in positions corresponding to the image areas and uses the logical sum as the grey level value of the superimposed image. For instance, when a group of black pixels represented by a grey level value of "1" are superimposed, a black pixel with a grey level value of "1" is produced, and when a group of white pixels represented by a grey level value of "0" are superimposed, a white pixel with a grey level value of "0" is produced. When a black pixel represented by a grey level value of "1" and a white pixel represented by a grey level value of "0" are superimposed, a black pixel with a grey level value of "1" is produced. In other words, the grey level value p (a, b) of a pixel located at coordinates (a, b) in an X-Y coordinate system with an origin O at the top left end of the image area in the superimposed image information is expressed by the following formula (2). Here, the grey level value of a pixel corresponding to coordinates (a, b) in an X-Y coordinate system with an origin O at the top left end of each partial image area is designated as $P_{x,y}$ (a, b), wherein $0 \leq a < W1$ and $0 \leq b < H1$.

$$p(a, b) = \sum_{y} \sum_{x} p_{x,y}(a, b) \qquad (2)$$

The control unit 210 directs the ID information memory 240 to store the superimposed image information, in which the grey level value of each pixel is represented by the formula (2), as feature quantities of distribution of detectable substances in association with the paper medium ID. It should be noted that below the superimposed image information stored in the ID information memory 240 is called "superimposed image information used for registration".

The verification processing performed by the verification device 300 will be explained next.

During the verification processing, the control unit 310 of the verification device 300 generates superimposed image information (referred to as "superimposed image information used for verification" below) based on a printed material in the same manner as during the superimposed image information generation processing performed by the control unit 210 of the registration device 200. The control unit 310 then verifies the superimposed image information used for verification against the superimposed image information used for registration stored in the ID information memory 240.

Figure 24:
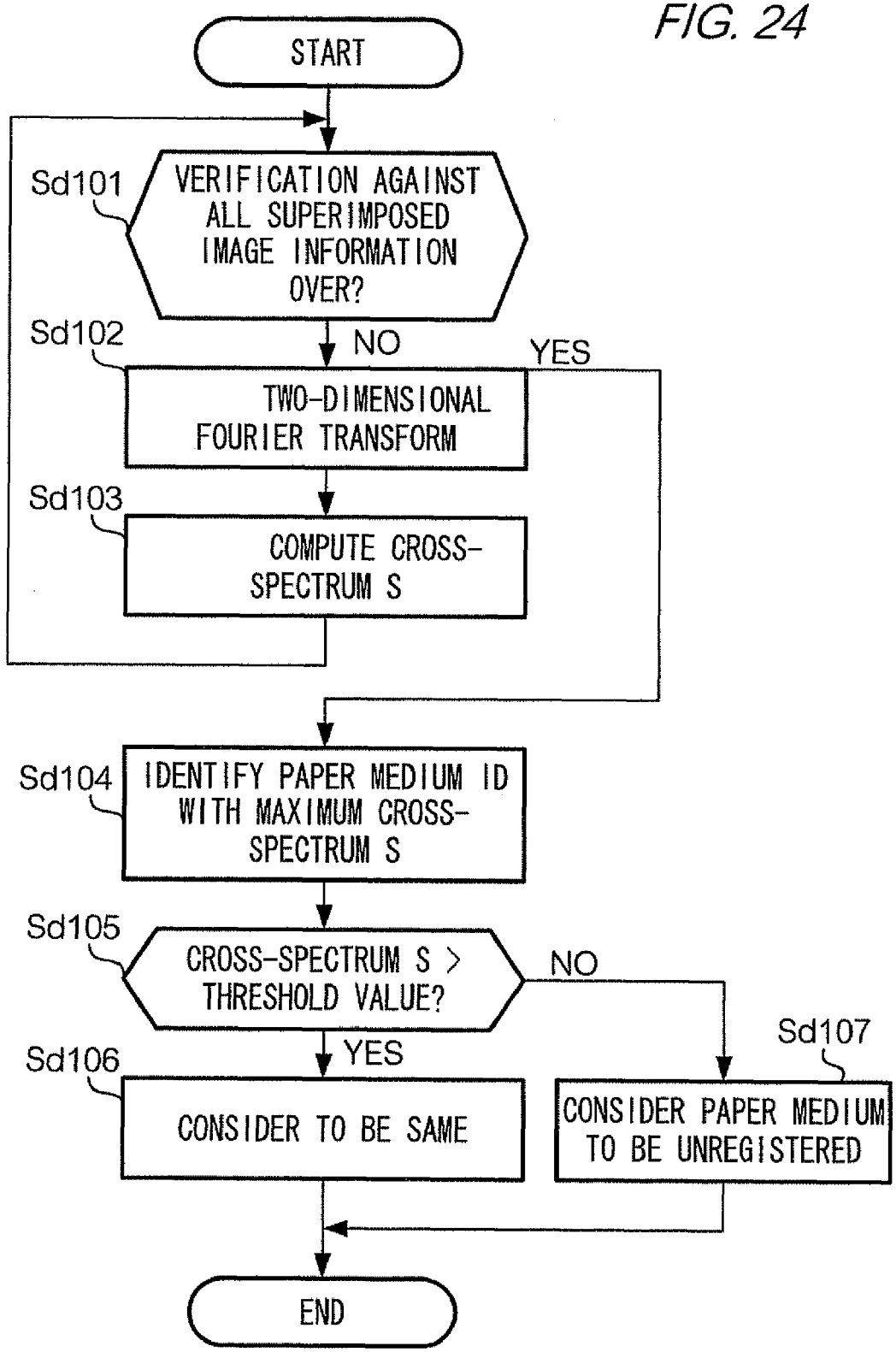
FIG. 24 is a flow chart illustrating verification processing by the control unit of the verification device.

FIG. 24 is a flow chart illustrating the verification processing performed by the control unit 310. It will be explained below by referring to the same drawing.

First of all, the control unit 310 performs a two-dimensional Fourier transform on the superimposed image information used for verification and superimposed image information used for registration stored in the ID information memory 240 (Step Sd102). It should be noted that the superimposed image information used for registration obtained after undergoing a two-dimensional Fourier transform is designated as $F_{ir}$ and the superimposed image information used for verification is denoted as $F_i$. Subsequently, based on the superimposed image information used for registration $F_{ir}$ and superimposed image information used for verification $F_i$, the control unit 310 computes a cross-spectrum S (Step Sd103).

The cross-spectrum is defined by the following formula (3). It should be noted that $F^{-1}$ designates an inverse Fourier transform.

$$S = F^{-1}(F_{ir} \times F_i) \quad (3)$$

Next, the control unit 310 determines whether all of the superimposed image information used for registration stored in the ID information memory 240 has been verified against the superimposed image information used for verification (Step Sd101). If the control unit 310 determines that not all of the superimposed image information used for registration has been verified (Step Sd101: "NO"), it repeats the processing steps Sd102 and Sd103.

On the other hand, if the control unit 310 determines that all of the superimposed image information used for registration has been verified (Step Sd101: "YES"), it identifies the paper medium ID, for which the cross-spectrum value S reaches a maximum value (Step Sd104). Subsequently, the control unit 310 determines whether the cross-spectrum value S computed based on the identified paper medium ID exceeds a predetermined threshold value (Step Sd105). If the control unit 310 determines that the cross-spectrum value S exceeds the threshold value (Step Sd105: "YES"), it makes a determination to the effect that the paper medium corresponding to the identified paper medium ID is identical to the printed material due to the high correlation between the superimposed image information used for registration and superimposed image information used for verification (Step Sd106). It should be noted that the threshold value is provided because there are cases, in which paper media are not registered in the registration device 200. In such cases, even a maximal cross-spectrum will have a relatively low value. In other words, by providing the threshold value, the control unit 310 can avoid misjudgment of the printed material.

On the other hand, if the determination result in Step Sd105 is "NO", the control unit 310 makes a determination to the effect that the paper medium of the printed material has not been registered in the registration device 200 (Step Sd107).

D. Exemplary Embodiment 4

Exemplary Embodiment 4 of the present invention will be explained next. In Exemplary Embodiment 4, the operation of object extraction processing is different from the Exemplary Embodiment 1, but other operations and device configuration are the same. Thus, detailed explanations will be provided below with regard to the object extraction processing.

When, for instance, images are formed on both sides of the paper medium, the control unit 310 generates image information by extracting only images corresponding to the detectable substances from the image represented by the image information generated by reading and carries out the verification.

Below, the flow of processing performed by the control unit 310 to extract only the images corresponding to the detectable substances from the generated image information will be explained with reference to FIG. 25 and FIGS. 26A to 26G. It should be noted that, in the explanations below, the image corresponding to the visible image formed on the paper medium within the image represented by the image information generated by the image reading unit 320 by reading the printed material is called "printed image" and images corresponding to the detectable substances are called "detectable substance images".

Figure 25:
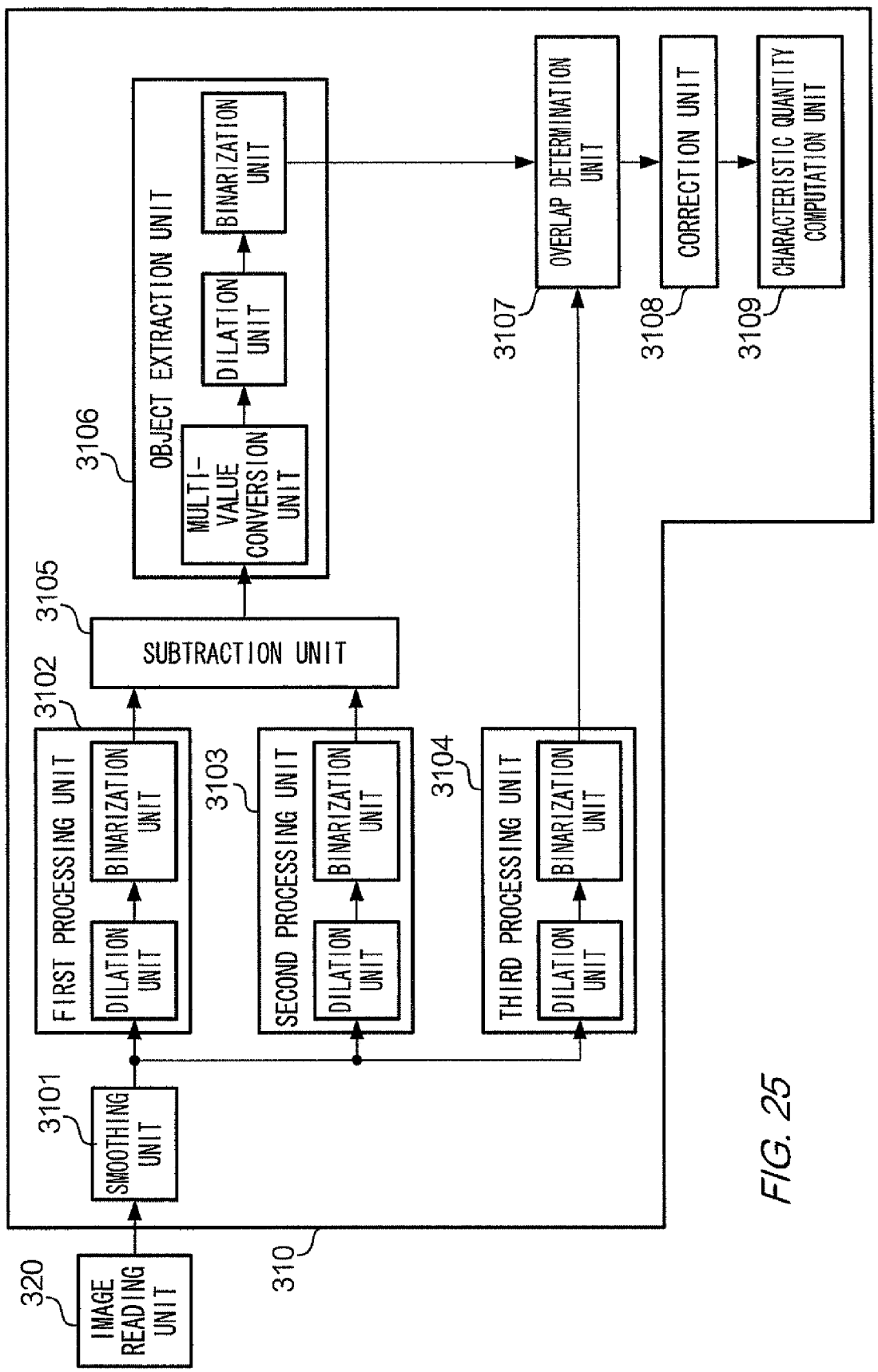
FIG. 25 is a functional block diagram illustrating the functions performed by the control unit of the verification device.

FIG. 25 is a functional block diagram illustrating the functions performed by the control unit 310. It should be noted that the arrows in the figure schematically show the flow of data.

It should be noted that, in the figure, the smoothing processing unit 3101, the first processing unit 3102, the second processing unit 3103, the third processing unit 3104, the subtraction processing unit 3105, the object extraction processing unit 3106, the overlap determination unit 3107, the correction unit 3108, and the feature quantity computing unit 3109 are implemented as a result of execution of the feature quantity computation/verification program P4 by the control unit 310.

FIGS. 26A to 26G are diagrams schematically showing an image represented by the image information obtained upon execution of processing by each functional block illustrated in FIG. 25. As shown in FIGS. 26A to 26G, this image is made up of printed images A1 and detectable substance images A2.

Figure 26:
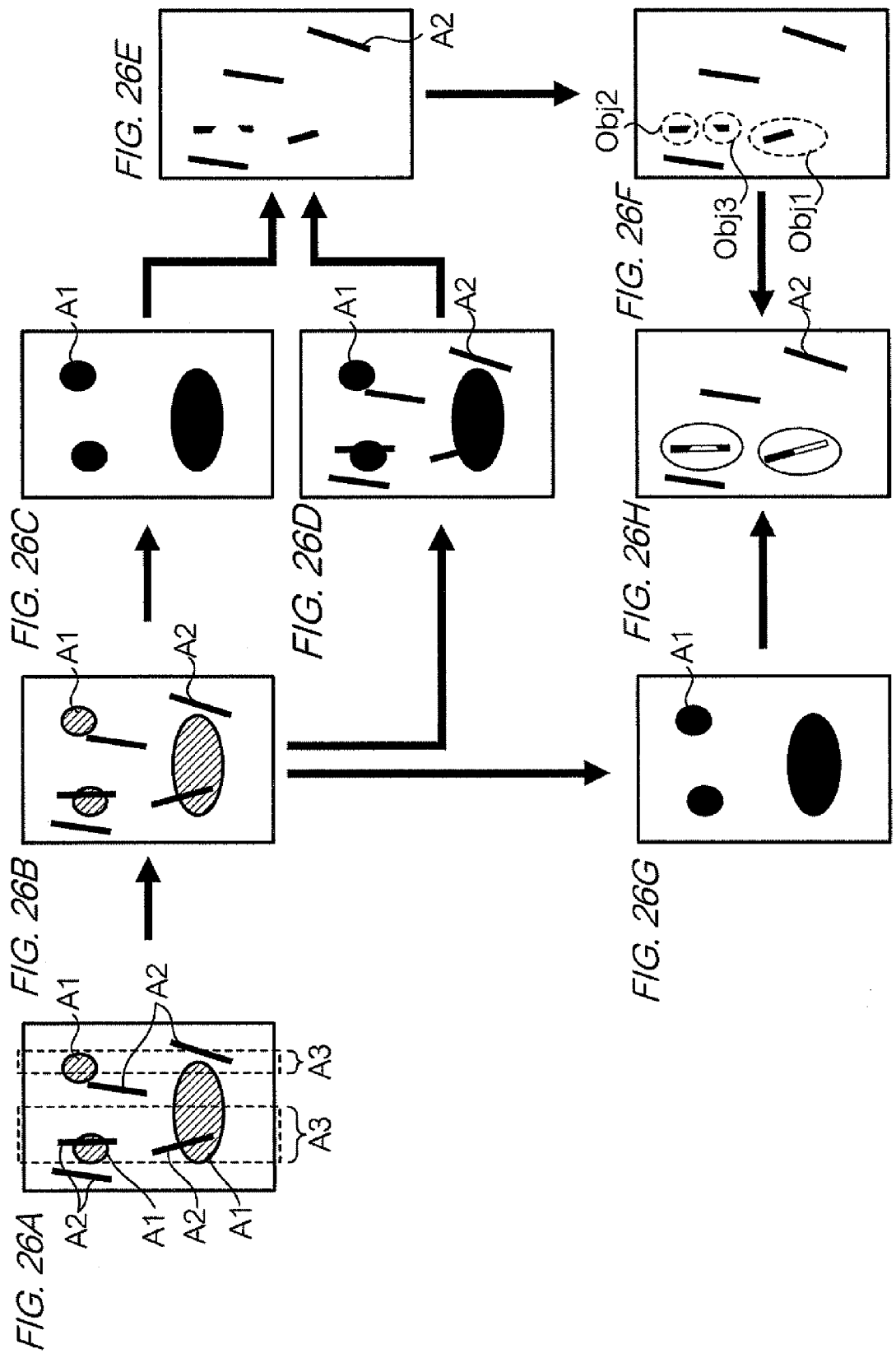
FIGS. 26A to 26H are diagrams schematically showing images represented by the image information obtained upon execution of processing by each functional block.

The image reading unit 320 generates image information representing an image obtained by reading the printed material. At such time, as shown in FIG. 26A, low-density noise images A3, which are due to variations in the grey scale level of the substrate and the process of reading images, are contained in the image information alongside with the printed images A1 and detectable substance images A2.

The smoothing processing unit 3101 acquires the image information from the image reading unit 320 and executes smoothing processing. This processing is implemented, for instance, by applying a smoothing filter of a predetermined size. As shown in (b) of the same figure, as a result of this processing, the noise images A3 are eliminated from the generated image information.

The first processing unit 3102, second processing unit 3103, and third processing unit 3104 each include a expansion processing unit and a binarization processing unit.

After acquiring the image information from the image reading unit 320 and executing a strong expansion (with a large number of neighboring pixels) on the image information, the second processing unit 3102 carries out binarization processing using a relatively high threshold value. More specifically, after executing "7×7 pixel expansion processing" three times, the first processing unit 3102 executes "5×5 pixel expansion processing" three times and then carries out binarization processing using a threshold value obtained by adding "45" to an average of the grey level values of all the pixels of the image information. As shown in (c) of the same figure, as a result of this processing, the printed images A1 and detectable substance images A2 are emphasized by the strong expansion and, as a result of the binarization processing using a high threshold value, image information is generated, in which only printed images A1 having a high degree of luminance can be seen.

After acquiring the image information from the image reading unit 320 and executing a weak expansion (with a small number of neighboring pixels) on the image information, the first processing unit 3103 carries out binarization processing operation using a relatively low threshold value (d). More specifically, after executing "5×5 pixel expansion processing" twice, the second processing unit 3103 executes "3×3 pixel expansion processing" three times and then carries out binarization processing using a threshold value obtained by adding "22" to an average of the grey level values of all the pixels of the image information. As shown in (d) of the same figure, as a result of this processing, the printed images A1 and detectable substance images A2 are emphasized less intensely by the weak expansion and, as a result of the binarization processing using a low threshold value, image information is generated, in which printed images A1 can be seen alongside the detectable substance images A2 having a low degree of luminance.

The subtraction processing unit 3105 acquires the image information from the first processing unit 3102 and the second processing unit 3103 and generates image information showing differences in the grey level values of the pixels located in positions corresponding to different pieces of image information. As shown in (e) of the same figure, as a result of this processing, image information is generated, in which only the detectable substance images can be seen. In the image information supplied by the first processing unit 3102 and the second processing unit 3103, the grey level value of the pixels of the printed images A1 and detectable substance images A2 are "255" and the grey level value of other pixels (which correspond to the background) is "0". Thus, the subtraction processing unit 3105 generates image information by inverting these grey level values and then computes differences, thereby producing image information, in which only the pixels of the detectable substance images A2 are represented by a grey level value of "255".

The object extraction processing unit 3106 acquires the image information from the subtraction processing unit 3105 and executes grey scale conversion processing, expansion processing, and binarization processing. More specifically, the object extraction processing unit 3106 extracts objects by executing "5×5 pixel expansion processing" twice, executing "3×3 pixel expansion processing" three times and then executing binarization processing using a threshold value obtained by adding "22" to an average of the grey level values of all the pixels of the image information. As shown in (f) of the same figure, as a result of this processing, image information is generated, in which the detectable substance images A2 are further emphasized and objects are extracted based on expansion processing after grey scale conversion processing. Items exceeding the minimum reference values of length, perimeter, and area specified for objects are extracted by the object extraction processing unit 3106 as objects from the binarized image information. Here, the minimum reference value for length is "100", the minimum reference value for perimeter is "300", and the minimum reference value for area is "3,000".

After acquiring the image information from the image reading unit 320 and executing a weak expansion on the image information, the third processing unit 3104 carries out binarization processing using a relatively high threshold value. More specifically, after executing "5×5 pixel expansion processing" twice, the third processing unit 3104 executes "3×3 pixel expansion processing" three times and then carries out binarization processing using a threshold value obtained by adding "45" to an average of the grey level values of all the pixels of the image information. As shown in (g) of the same figure, the printed images A1 and detectable substance images A2 are emphasized by the weak expansion and, as a result of the binarization processing using a high threshold value, only printed images A1 having a high degree of luminance can be seen. The difference between the processing executed by the third processing unit 3104 and the processing executed by the first processing unit 3102 is in the intensity of the expansion processing. As far as the image information obtained upon execution of processing by the first processing unit 3102 is concerned, due to the differences in image information produced by the processing performed by the second processing unit 3103 in the manner, only the detectable substance images A2 can be seen. Thus, if the printed images A1 are not rendered thicker in advance, even the outer edge portions of the printed images will appear as the detectable substance images A2.

The overlap determination unit 3107 acquires the image information from the object extraction processing unit 3106 and third processing unit 3104 and identifies image areas, in which the printed images A1 overlap with the objects. This is done because even though object extraction processing is performed by the object extraction processing unit 3106, there may be situations, in which objects cannot be accurately separately extracted due to the way the printed images A1 overlap with the detectable substance images A2. When the objects are extracted, a portion of the objects cut out, such as, for instance, in case of objects Obj1, Obj2, and Obj3 illustrated in FIG. 26F.

Here, the processing executed by the overlap determination unit 3107 will be explained with reference to FIGS. 27A to 27D.

The overlap determination unit 3107 examines the length pixel count) of the respective objects in order to identity objects with a partial cutout. Subsequently, the overlap determination unit 3107 identifies objects shorter than a certain length. Since the length of the objects is a value corresponding to the length of the detectable substances, the overlap determination unit 3107 can extract objects with a partial cutout by identifying objects shorter than a predetermined length. Subsequently, the overlap determination unit 3107 makes a determination as to whether the printed images A1 are in contact with the objects. The purpose of this processing is to extract objects having a partial cutout due to overlapping with the printed images A1. Specifically, the overlap determination unit 3107 can identity the position of the objects based on image information representing the image illustrated in FIG. 26F can identify the position of the printed images A1 from image information representing the image illustrated in FIG. 26G. Accordingly, by examining the corresponding positions of the respective image, the overlap determination unit 3107 can identify objects that are in contact with the printed images A1.

It should be noted that if the overlap determination unit 3107 determines that an object with a partial cutout is not in contact with the printed images A1, it determines that the object was generated by noise when, for instance, the image was read in, and that it was not extracted from a detectable substance image.

When executing the above processing, the overlap determination unit 3107 supplies identifying information representing the identified objects along with the image information (image information corresponding to FIGS. 26F and 26G) to the correction unit 3108.

Figure 27:
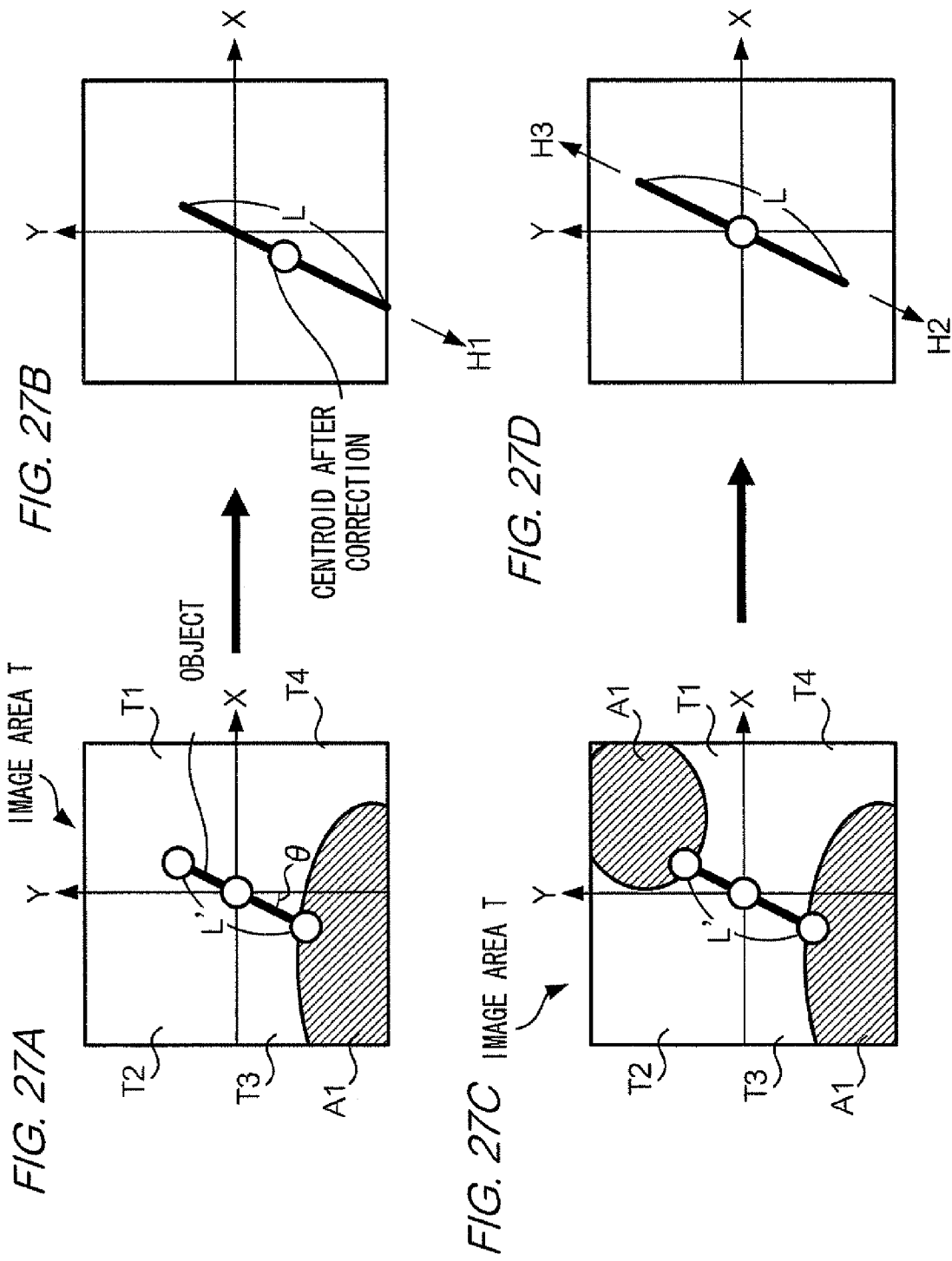
FIGS. 27A to 27D are diagrams explaining the processing carried out by the correction unit.

The correction unit 3108 corrects the objects with partial cutouts based on the object identifying information and image information acquired from the overlap determination unit 3107. Below, the processing executed by the correction unit 3108 to correct the objects will be explained with reference to FIGS. 27A to 27D. If the length L' of an object is equal or greater than a reference value L, the correction unit 3108 determines that the object does not have a cutout and does not perform correction on the object. It should be noted that the reference value L is determined in accordance with the length of the detectable substances. On the other hand, if the length L' of an object is less than the reference value L, the correction unit 3108, as shown in FIG. 27A, defines an X-axis and a Y-axis with an origin at the centroid of the object, and identifies a square image area T with a center at the point of intersection of the X-axis and Y-axis. At such time, the image area T has a side with a length equal to the greater of $\frac{2}{3} \times L' \times \cos\theta$ or $\frac{2}{3} \times L' \times \sin\theta$, wherein $\theta$ is an angle between the Y-axis and the object. The correction unit 3108 divides this image area T into four image areas T1-T4, with the X-axis and Y-axis serving as boundaries therebetween. The correction unit 3108 then examines the respective image areas T1-T4. If there are image areas including both an object edge and a printed image A1, it determines that they are in contact.

If, as shown in FIG. 27A, the correction unit 3108 identifies only one location (image area T3), in which an object comes into contact with a printed image A1, the length of the object is corrected as shown in FIG. 27B. Namely, the correction unit 3108 corrects it such that the length of the object becomes longer by L-L' in the direction of the printed image A1 (in the direction of arrow H1 in the drawing). Due to the correction, the position of the centroid also shifts by (L-L')/2 in the direction of arrow H1. In addition, as shown in FIG. 27C, if the correction unit 3108 identifies two locations (image areas T1 and T3), in which an object comes into contact with printed images A1, the length of the object is corrected as shown in FIG. 27D. Namely, the correction unit 3108 corrects it such that the length of the object becomes longer by (L-L')/2 in the direction of the respective printed images A1 (in the direction of arrows H2 and H3 in the drawing). Due to this correction, the position of the centroid does not change.

FIG. 26H is an image representing image information corrected using the procedure explained above. As shown in the same figure, the length of object Obj1, which had been shortened by a cutout, was restored to its original length, while the two short objects Obj2 and Obj3, which had been produced by a cutout, were restored so as to form the original single object.

In the same manner as in the Exemplary Embodiment 1, when the feature quantity computation unit 3109 acquires the corrected image information shown in FIG. 26H from the correction unit 3108, it computes the feature quantities of detectable substance distribution based on the objects. The control unit 310 then carries out verification against the feature quantities of detectable substance distribution stored in the ID information memory 240 of the registration device 200.

E. Alternate Exemplary Embodiments

It should be noted that the exemplary embodiments may be modified in the following manner. Specifically, the following modifications are suggested. It should be noted that any of these modifications may also be combined as appropriate.

In the Exemplary Embodiment 4, after carrying out processing to extract only objects from the image information obtained by reading the printed material wherein images are formed on both sides of a paper medium, the verification device 300 corrects the objects and then carries out verification processing. However, the verification processing may be carried out without performing object correction. The procedure of such processing is explained below.

It should be noted that the registration device 200 stores the image information obtained by reading the paper medium as feature quantities of detectable substance distribution in association with paper medium IDs in the ID information memory 240. Namely, this image information contains only the detectable substance images.

The verification device 300 reads the printed material and generates image information produced by extracting printed images of high luminance, as shown in the FIG. 26C, and image information, in which only the detectable substance images can be seen, as shown in FIG. 26E, and stores them in the memory 313. Next, when the control unit 310 reads the image information stored for each paper medium ID stored in the ID information memory 240, it superimposes the image information containing only the printed images, as shown in FIG. 26C, onto this image information. Subsequently, the control unit 310 carries out processing to extract objects from this image information using the same method as in Exemplary Embodiment 4 and then carries out verification processing.

By doing so, the verification processing is carried out after performing processing to extract objects from information including both the detectable substance images and printed images, and, as a result, the control unit 310 does not have to perform object correction. However, when the printed images are superimposed onto the image information representing all the detectable substances stored in the ID information memory 240, the time required for the verification processing may become excessively long. For this reason, it may be sufficient for the control unit 310 to divide the image information produced by reading the printed material and the image information stored in the ID information memory 240 into multiple image areas, reconstruct the printed images and carry out verification processing only on pairs of corresponding image areas, in both of which objects are present.

As concerns the read side and read direction of the paper medium (printed material) in the image reading unit 220 of the registration device 200 and image reading unit 320 of the verification device 300, there may be different read directions used depending on the actual placement of the paper medium by the user. Specifically, depending on the front and reverse sides of the paper medium and top-to-bottom direction of the paper media, the image reading units may generate a total of four pieces of image information for a single sheet of paper media. In other words, the verification device 300 cannot perform the intended verification if these patterns are not taken into consideration in cases, in which any one of these is not identified. Next, explanations will be provided regarding the differences resulting from different read sides and read directions of the paper medium in each of the exemplary embodiments, as well as regarding the corresponding correction methods.

Figures 28, 29:
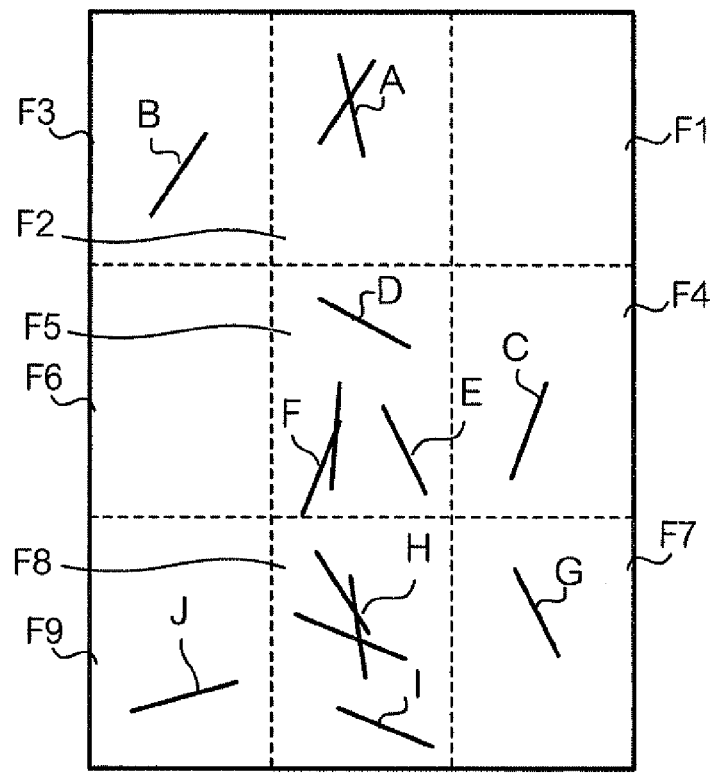
FIG. 28 is a diagram illustrating an exemplary image containing objects.
FIG. 29 is a diagram illustrating the correlation between the image areas and between the angular ranges established when the verification device reads the front and reverse sides of the paper medium.

First of all, in Exemplary Embodiment 1, when the paper medium shown in FIG. 11 is read, it is divided into partial image areas F1-F9 as shown in FIG. 14 and divided into angular ranges R1-R4 as shown in FIG. 17. Incidentally, when the paper medium is read in the same top-to-bottom direction, but from opposite read sides, the image illustrated in FIG. 11 is read as an image inverted in the right-to-left direction, as shown in FIG. 28. FIG. 29 illustrates the correlation between the respective partial image areas and between the angular ranges established when the verification device 300 reads the front and reverse sides of the paper medium. Accordingly, using the correlation shown in FIG. 29, the verification device 300 can carry out verification processing based on both sides, such that the intended verification processing can be carried out regardless of the read side of the paper medium.

Next, when the center of the image information is used as the origin in Exemplary Embodiment 2, the position of the origin does not change regardless of which of the above-mentioned four directions is used for reading. However, when the top-to-bottom direction of reading is the same, but reading is performed on the opposite read side, the coordinate values $(\theta, \rho)$ in the Hough plane will correspond to a position, whose coordinates are $(\pi-\theta, \rho)$. Moreover, when the read side is the same, but the top-to-bottom direction of reading is the opposite direction, they will correspond to a position, whose coordinates are $(\theta, -\rho)$. Furthermore, when both the read sides and the top-to-bottom directions of reading are opposite, they will correspond to a position, whose coordinates are (π−θ, −ρ). Thus, the verification device 300 can perform the verification processing by comparing coordinates corrected based on these correlations.

Next, in Exemplary Embodiment 3, respective instances of image information obtained by rotating the superimposed image information used for verification and superimposed image information used for registration through 90 degrees at a time may be subjected to verification processing using a cross-spectrum.

Furthermore, since in Exemplary Embodiment 4 the method used to compute the feature quantities associated with the detectable substances is the same, verification may be carried out based on the correlations of the image areas and angular ranges, in the same manner as in Exemplary Embodiment 1.

In each of the exemplary embodiments, the image reading units 220 and 320 generated image information by reading one side of the paper medium. However, the image reading units may generate image information by reading both sides. In such a case, the construction of the image reading units may be the same as the construction of FIG. 3. After reading one side, the other side may be read by feeding the medium and inverting it. Moreover, it may be adapted to have a light source and a sensor identical to the light source 221 and sensor 222 provided in corresponding positions on the other side of the paper medium in order to simultaneously read both sides. In such a case, the registration device 200 computes and stores two types of feature quantities for the front and reverse side of a single sheet.

In each of the exemplary embodiments, the image reading unit 220 read the paper medium fed from the paper supply tray prior to the transfer of the toner images by the transfer station. However, a separate device such as a scanner may be used as the image reading unit. Namely, a configuration may be used that allows a user to read in paper media the user wants to register in the registration device 200.

Moreover, the Exemplary Embodiment 4 may be adapted to allow the registration device 200 to carry out processing to generate image information by extracting only images corresponding to the detectable substances from the image represented by the image information. This configuration makes it possible to extract objects e.g. even from paper media having various patterns formed thereon.

In the exemplary embodiments, the verification device 300 computed feature quantities based on image information generated by reading by the image reading unit 320 and conducted verification processing. The verification device 300 may be adapted to perform verification processing based on image information acquired from an external device. For instance, the verification device 300 is provided with a communication unit, i.e. an interface device used to effect communication via a network, capable of communicating with a scanner installed in an external spatial region. When a paper medium is read by the external scanner, the verification device 300 acquires the image information and carries out verification processing. Even if a printed material whose taking out is prohibited has been taken out to an external spatial region, by identifying the scanner, the control unit 310 can pinpoint its location, and, in addition, it can identify paper medium IDs based on the feature quantities of detectable substance distribution and can identify attribute information such as the information illustrated in FIG. 5.

Moreover, the external scanner is installed in an external spatial region in the vicinity of the door 400 and the verification device 300 carries out verification processing based on images read by the scanner The verification device 300 then examines a field, not shown, which is associated with the attribute information and contains records stating whether a printed material can be brought inside. If the printed material can be brought inside, the verification device 300 outputs a control signal to the door opening/closing unit 401 in order to open the door 400. The verification device 300 may be adapted to perform printed material management by detecting whether a printed material that has been carried outside is brought inside and making a note of that in a file. Quite naturally, when a printed material is carried outside, the verification device 300 makes a note of that in the file.

In each of the exemplary embodiments, upon identification of paper medium IDs in the course of verification processing, the control unit 310 of the verification device 300 outputted a control signal controlling the opening/closing of the door 400 in accordance with the contents of the ID information management table 241. It should be noted that information related to the results of verification, as outputted by the control unit 310, is not limited thereto. For instance, the verification device 300 may examine the attribute information table shown in FIG. 5 and output data recorded in the fields corresponding to the identified paper medium IDs and information indicating whether a printed material has been taken outside to an information terminal, not shown, installed in an external spatial region. Moreover, it may be adapted to direct an image forming device, not shown, to print this information on paper media.

In each of the exemplary embodiments, the registration device 200 carries out processing related to the registration of paper media and the verification device 300 carries out processing related to the verification of a printed material. However, they may be implemented as a single device, adapted to have shared units, or implemented by partially employing external devices.

If they are implemented as a single device (registration/verification device), the registration/verification device reads a paper medium (first recording medium) placed on the image reading unit and generates image information when an operation is performed by the user to instruct it to register the paper medium. Subsequently, after computing the feature quantities of detectable substance distribution, the registration/verification device stores them in the ID information memory. Furthermore, the registration/verification device reads a printed material (second recording medium) placed on the image reading unit and generates image information when an operation is performed by the user to instruct it to verify the paper medium. After computing the feature quantities of detectable substance distribution, the registration/verification device reads the feature quantities from the ID information memory, performs verification, and outputs information on the results of verification.

Moreover, in the verification system 100, the ID information memory 240 may be part of the verification device 300 or may be an external storage device. Furthermore, the image reading unit may be shared. For example, when an operator instructs the registration device 200 to register a paper medium by operating the operator input unit 230, the registration device 200 registers the read paper medium and, at the same time, when a user wants to carry a printed material outside and places it on the unit to be read, the registration device 200 reads its and outputs the generated information to the verification device 300. The verification device 300 then acquires this image information and carries out the subsequent processing.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an image information acquisition unit that acquires image information representing an image obtained by reading a recording medium containing one or a plurality of detectable substances;
an extraction unit that extracts an image corresponding to the detectable substances from the image information acquired by the image information acquisition unit;
a computation unit that calculates a number of detectable substances in the recording medium overlapping each other when viewed from a direction perpendicular to a surface of the recording medium based on the image corresponding to the detectable substances extracted by the extraction unit; and
a memory that stores the number of detectable substances calculated by the computation unit.

2. The image processing apparatus according to claim 1, wherein:
the computation unit calculates a number of detectable substances in the recording medium overlapping each other for each predetermined partial image area of the recording medium, and
the memory stores the number of detectable substances calculated by the computation unit for each of the partial image areas.

3. The image processing apparatus according to claim 1, wherein:
the computation unit calculates the number of detectable substances by dividing the image corresponding to the detectable substances extracted by the extraction unit into a plurality of image areas and generating superimposed image information by superimposing these image areas.

4. The image processing apparatus according to claim 1, wherein:
the extraction unit extracts an image corresponding to the detectable substances based on a difference between first image information obtained by extracting an image area having a luminance higher than a first luminance and second image information obtained by extracting an image area having a luminance higher than a second luminance that is lower than the first luminance from the image information acquired by the image information acquisition unit, and
the computation unit corrects the image information representing the image corresponding to the detectable substances extracted by the extraction unit based on the image information acquired by the image information acquisition unit and computes the feature quantities based on the corrected image information.

5. The image processing apparatus according to claim 1, wherein:
the computation unit performs a Hough transform on the image information representing the image corresponding to the detectable substances extracted by the extraction unit and computes information corresponding to the results of the Hough transform as the feature quantities of the recording medium.

6. An image processing apparatus comprising:
an image information acquisition unit that acquires image information representing an image obtained by reading a recording medium containing one or a plurality of detectable substances;
an extraction unit that extracts an image corresponding to the detectable substances from the image information acquired by the image information acquisition unit;
a computation unit that calculates a number of detectable substances in the recording medium overlapping each other when viewed from a direction perpendicular to a surface of the recording medium based on the image corresponding to the detectable substances extracted by the extraction unit;
a verification unit that acquires the number of the detectable substances from an external device and verifies the acquired number of detectable substances against the number of detectable substances calculated by the computation unit; and
an output unit that outputs information on the results of verification by the verification unit.

7. The image processing apparatus according to claim 6, wherein:
the computation unit calculates a number of detectable substances in the recording medium overlapping each other for each predetermined partial image area of the recording medium, and
the verification unit verifies the number of detectable substances of each predetermined partial image area acquired from an external device against the number of detectable substances calculated by the computation unit, for each of the partial image areas.

8. An image processing apparatus comprising:
an image information acquisition unit that acquires image information representing an image obtained by reading a recording medium containing one or a plurality of detectable substances;
an extraction unit that extracts an image corresponding to the detectable substances from the image information acquired by the image information acquisition unit;
a computation unit that calculates a number of detectable substances in the recording medium overlapping each other when viewed from a direction perpendicular to a surface of the recording medium based on the image corresponding to the detectable substances extracted by the extraction unit;
a memory that stores the number of detectable substances calculated by the computation unit;
a verification unit that verifies the number of detectable substances stored in the memory for a first recording medium against the number of detectable substances computed by the computation unit for a second recording medium and outputs information on the results of verification; and
an output unit that outputs information on the results of verification by the verification unit.

9. A verification system comprising:
a first image information acquisition unit that acquires image information representing an image obtained by reading a first recording medium containing one or a plurality of detectable substances;
a first extraction unit that extracts an image corresponding to the detectable substances from the image information acquired by the first image information acquisition unit;

a first computation unit that calculates a number of detectable substances in the first recording medium overlapping each other when viewed from a direction perpendicular to a surface of the first recording medium based on the image corresponding to the detectable substances extracted by the first extraction unit;

a memory that stores the number of detectable substances calculated by the first computation unit;

a second image information acquisition unit that acquires image information representing an image obtained by reading a second recording medium containing one or a plurality of detectable substances;

a second extraction unit that extracts an image corresponding to the detectable substances from the image information acquired by the second image information acquisition unit;

a second computation unit that calculates a number of detectable substances in the second recording medium overlapping each other when viewed from a direction perpendicular to a surface of the second recording medium based on the image corresponding to the detectable substances extracted by the second extraction unit; and a verification unit that verifies the number of detectable substances calculated by the second computation unit for the second recording medium against the number of detectable substances stored in the memory for the first recording medium;

an output unit that outputs information on the results of verification by the verification unit.

10. The verification system according to claim 9, wherein:

the first computation unit calculates the number of detectable substances in the first recording medium by dividing the image information corresponding to the detectable substances extracted by the first extraction unit into a plurality of image areas and generating first superimposed image information obtained by superimposing these image areas;

the memory stores the first superimposed image information generated by the first computation unit;

the second computation unit calculates the number of detectable substances in the second recording medium by dividing the image information corresponding to the detectable substances extracted by the second extraction unit into a plurality of image areas and generating second superimposed image information obtained by superimposing these image areas; and the verification unit verifies the number of detectable substances of the first superimposed image information against the second superimposed image information by computing a cross-spectrum of the first superimposed image information stored in the memory and the second superimposed image information generated by the second computation unit and determining the results of verification based on the computed cross-spectrum.

11. The verification system according to claim 9, further comprising:

an attribute information acquisition unit that acquires attribute information representing attributes of a visible image formed on the first recording medium, and wherein the memory stores the attribute information acquired by the attribute information acquisition unit in association with the feature quantities computed by the first computation unit, and the output unit outputs the results of verification and the attribute information stored by the memory in association with the feature quantities.

12. The verification system according to claim 11, wherein:

the attribute information is information indicating whether the first recording medium having a visible image formed thereon may be taken from a predetermined spatial region to an external spatial region, and when the attribute information stored by the memory in association with the number of detectable substances indicates that taking out is not possible, the output unit outputs information indicating that taking out of the second recording medium corresponding to the first recording medium is not possible.

13. The verification system according to claim 12, further comprising:

a gate; and a controller that either generates an alert indicating that the second recording medium is about to be taken out to an external spatial region or controls the gate so as to prevent taking out to an external spatial region when the results of verification by the verification unit satisfy prescribed conditions and the attribute information stored by the memory in association with the feature quantities indicates that taking out is not possible.

14. An image processing method comprising:

acquiring image information representing an image obtained by reading a recording medium containing one or a plurality of detectable substances;

extracting an image corresponding to the detectable substances from the acquired image information;

calculating a number of detectable substances in the recording medium overlapping each other when viewed from a direction perpendicular to a surface of the recording medium based on the image corresponding to the extracted detectable substances; and storing the calculated number of detectable substances, wherein the method is performed using a computer or a processor.

15. The image processing method according to claim 14, wherein the computing step calculates a number of detectable substances in the recording medium overlapping each other for each predetermined partial image area of the recording medium, and the storing step stores the feature quantities computed in the computing step for each of the partial image areas.

16. An image processing apparatus comprising:

an image information acquisition unit that acquires image information representing an image obtained by reading a recording medium containing one or a plurality of detectable substances;

an extraction unit that extracts an image corresponding to the detectable substances from the image information acquired by the image information acquisition unit;

a computation unit that calculates a number of detectable substances extending in a direction with a predetermined angle range, the direction defined with respect to a predetermined direction on a surface of the recording medium, based on the image corresponding to the detectable substances extracted by the extraction unit; and a memory that stores the number of detectable substances computed by the computation unit.

17. An image processing apparatus comprising:

an image information acquisition unit that acquires image information representing an image obtained by reading a recording medium containing one or a plurality of detectable substances;

an extraction unit that extracts an image corresponding to the detectable substances from the image information acquired by the image information acquisition unit;

a computation unit that calculates a number of detectable substances extending in a direction with a predetermined angle range, the direction defined with respect to a predetermined direction on a surface of the recording medium, based on the image corresponding to the detectable substances extracted by the extraction unit;

a verification unit that acquires the number of detectable substances of distribution of the detectable substances from an external device and verifies the acquired number of detectable substances against the number of detectable substances computed by the computation unit; and an output unit that outputs information on the results of verification by the verification unit.

18. An image processing apparatus comprising:

an image information acquisition unit that acquires image information representing an image obtained by reading a recording medium containing one or a plurality of detectable substances;

an extraction unit that extracts an image corresponding to the detectable substances from the image information acquired by the image information acquisition unit;

a computation unit that calculates a number of detectable substances extending in a direction with a predetermined angle range, the direction defined with respect to a predetermined direction on a surface of the recording medium, based on the image corresponding to the detectable substances extracted by the extraction unit;

a memory that stores the number of detectable substances computed by the computation unit;

a verification unit that verifies the feature quantities stored in the memory for a first recording medium against the feature quantities computed by the computation unit for a second recording medium and outputs information on the results of verification; and an output unit that outputs information on the results of verification by the verification unit.

19. A verification system comprising:

a first image information acquisition unit that acquires image information representing an image obtained by reading a first recording medium containing one or a plurality of detectable substances;

a first extraction unit that extracts an image corresponding to the detectable substances from the image information acquired by the first image information acquisition unit;

a first computation unit that calculates a number of detectable substances in the first recording medium extending in a direction with a predetermined angle range, the direction defined with respect to a predetermined direction on a surface of the first recording medium, on the image corresponding to the detectable substances extracted by the first extraction unit;

a memory that stores the number of detectable substances computed by the first computation unit;

a second image information acquisition unit that acquires image information representing an image obtained by reading a second recording medium containing one or a plurality of detectable substances;

a second extraction unit that extracts an image corresponding to the detectable substances from the image information acquired by the second image information acquisition unit;

a second computation unit that calculates a number of detectable substances in the second recording medium extending in a direction with a predetermined angle range, the direction defined with respect to a predetermined direction on a surface of the second recording medium, based on the image corresponding to the detectable substances extracted by the second extraction unit; and a verification unit that verifies the number of detectable substances computed by the second computation unit for the second recording medium against the number of detectable substances stored in the memory for the first recording medium;

an output unit that outputs information on the results of verification by the verification unit.

20. An image processing method comprising:

acquiring image information representing an image obtained by reading a recording medium containing one or a plurality of detectable substances;

extracting an image corresponding to the detectable substances from the acquired image information;

calculating a number of detectable substances extending in a direction with a predetermined angle range, the direction defined with respect to a predetermined direction on a surface of the recording medium, based on the image corresponding to the extracted detectable substances; and storing the calculated number of detectable substances, wherein the method is performed using a computer or a processor.

* * * * *